United States Patent
Sakamoto

(10) Patent No.: US 7,709,767 B2
(45) Date of Patent: May 4, 2010

(54) LASER PROCESSING METHOD

(75) Inventor: Takeshi Sakamoto, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 7 days.

(21) Appl. No.: 11/658,703

(22) PCT Filed: Jul. 14, 2005

(86) PCT No.: PCT/JP2005/013055

§ 371 (c)(1),
(2), (4) Date: Jan. 29, 2007

(87) PCT Pub. No.: WO2006/011372

PCT Pub. Date: Feb. 2, 2006

(65) Prior Publication Data

US 2009/0026185 A1 Jan. 29, 2009

(30) Foreign Application Priority Data

Jul. 30, 2004 (JP) .................. P2004-224505

(51) Int. Cl.
*B23K 26/40* (2006.01)
(52) U.S. Cl. ............................ 219/121.72; 438/463
(58) Field of Classification Search ............ 219/121.72, 219/121.67; 438/113, 114, 463, 462
See application file for complete search history.

(56) References Cited

U.S. PATENT DOCUMENTS 7,626,137 B2 * 12/2009 Fukuyo et al. ............... 438/463

(Continued)

FOREIGN PATENT DOCUMENTS

EP 1 338 371 8/2003

(Continued)

OTHER PUBLICATIONS

K. Hayashi; "Inner Glass Marking by Harmonics of Solid-State Laser", Proceedings of 45th Laser Materials Processing Conference, Dec. 1998, pp. 23-28.

(Continued)

*Primary Examiner*—Geoffrey S Evans
(74) *Attorney, Agent, or Firm*—Drinker Biddle & Reath LLP

(57) ABSTRACT

A laser processing method by which an object to be processed can be cut with a high precision is provided. The laser processing method of the present invention irradiates a planar object to be processed 1 with laser light L while locating a light-converging point P within the object 1. Initially, a first modified region 71 to become a start point for cutting is formed along a first line to cut 5a in the object 1. Subsequently, along a second line to cut 5b intersecting the line to cut 5a, a second modified region 72 to become a start point for cutting is formed so as to intersect at least a part of the modified region 71. Then, a fourth modified region 73 to become a start point for cutting is formed along the line to cut 5b. Thereafter, between the modified region 71 and an entrance face 1a of the object 1 where the laser light L is incident, a third modified region 74 to become a start point for cutting is formed along the line to cut 5a so as to intersect at least a part of the modified region 73.

6 Claims, 24 Drawing Sheets

U.S. PATENT DOCUMENTS

2004/0002199 A1* 1/2004 Fukuyo et al. .............. 438/463
2009/0004828 A1* 1/2009 Kobayashi .................. 438/463

FOREIGN PATENT DOCUMENTS

| JP | 2002-205180 | 7/2002 |
| JP | 2003-266185 | 9/2003 |
| WO | 2006/011372 | 2/2006 |

OTHER PUBLICATIONS

K. Miura et al., "Formation of Photo-Induced Structures in Glasses with Femtosecond Laser", Proceedings of $42^{nd}$ Laser Materials Processing Conference, Nov. 1997, pp. 105-111.

T. Sano et al., "Evaluation of Processing Characteristics of Silicon with Picosecond Pulse Laser", Preprints of the National Meeting of Japan Welding Society, No. 66, Apr. 2000, pp. 72-73 (with at least partial English translation).

* cited by examiner (B)

(A)

LASER PROCESSING METHOD

TECHNICAL FIELD

The present invention relates to a laser processing method used for cutting a planar object to be processed.

BACKGROUND ART

Known as this kind of prior art is a laser processing method which irradiates a wafer-like object to be processed with laser light while locating a light-converging point within the object, so as to form a plurality of rows of modified regions within the object along a line to cut, and employs the modified regions as a starting point region for cutting (see, for example, Patent Document 1).

Patent Document 1: Japanese Patent Application Laid-Open No. 2002-205180

DISCLOSURE OF THE INVENTION

Problem to be Solved by the Invention

When a planar object to be processed is to be cut into a lattice by using a laser processing method such as the one mentioned above, modified regions are formed within the object, for example, as shown in FIGS. 20(A) and 20(B). FIGS. 20(A) and 20(B) are schematic views for explaining an example of order of forming the modified regions 171, 172 within an object to be processed 101, whereas FIG. 21 is a sectional view of the object taken along the line XXI-XXI of FIG. 20(B).

The modified regions 171, 172 are formed in the following order. First, as shown in FIG. 20(A), the object 101 having a thickness 100d is irradiated with laser light 100L while locating a light-converging point within the object 101, so as to form the modified region 171 within the object 101 along a line to cut 105a. Subsequently, as shown in FIG. 20(B), the object 101 is irradiated with the laser light 100L while locating the light-converging point within the object 101, so as to form the modified region 172 within the object 101 along a line to cut 105b intersecting the line to cut 105a. Each of the modified regions 171, 172 is constituted by a plurality of rows of modified regions aligned in the thickness direction of the object 101, whereas these plurality of rows of modified regions are successively formed from the side farther from an entrance face 101a of the laser light 100L.

If the modified regions 171, 172 are formed in the above-mentioned order, an unmodified region (triangle area) 101b free of the modified region 172 will remain at a place where the modified regions 171 and 172 intersect each other as shown in FIG. 21. The unmodified region 101b increases its width W1 as it is distanced farther from the entrance face 101a of the laser light 100L. Such an unmodified region 101b is seen remarkably when the thickness 100d of the object 101 is large. FIG. 22 shows an example of photograph taking a picture of region A1 in FIG. 21, whereas FIGS. 23(A) and 23(B) show examples of photographs taking pictures of region B1 in FIG. 21. FIGS. 22, 23(A), and 23(B) are views showing photographs of cross sections of the object 101 cut by forming the modified regions 171, 172 in the above-mentioned order. FIGS. 22, 23(A), and 23(B) illustrate a case where the thickness 100d of the object 101 is large, i.e., 300 µm or greater.

The unmodified region 101b free of the modified region 172 is seen within the region P1 in FIG. 22. When the object 101 formed with the unmodified region 101b is cut with an expander, there is a fear of the object 101 failing to be cut with a high precision because of the unmodified region 101b. For example, chipping is seen within region P2 in FIG. 23(A), whereas a skirt (a portion projecting from a cross section 171s) is found within region P3 in FIG. 23(B).

Thus, there seems to remain room for improvement in the precision at which the object is cut into a lattice by forming the modified regions in the above-mentioned order.

In view of such circumstances, it is an object of the present invention to provide a laser processing method by which the object can be cut with a high precision.

Means for Solving Problem

For solving the problem mentioned above, the inventors studied in detail a mechanism by which the unmodified region 101b is formed. Results of the study will be explained with reference to FIG. 24. FIG. 24 is a schematic sectional view of the object 101 in a step at the time of forming the modified regions 171, 172 in the above-mentioned order. FIG. 24 shows a step of forming the modified region 172. A modified region 172a to become a part of the modified region 172 is formed within the object 101 by scanning with the laser light 100L converged by a lens 100LL. Since the modified region 171 has already been formed, the laser light 100L is more likely to be blocked by the modified region 171 as a position at which the modified region 172a is formed is distanced farther from the entrance face 101a. As a result, the width W1 of the unmodified region 101b seems to become broader as it is farther from the entrance face 101a.

Therefore, the laser processing method in accordance with the present invention includes a first step of irradiating a planar object to be processed with laser light while locating a light-converging point within the object, so as to form a first modified region to become a starting point region for cutting within the object along a first line to cut in the object, and form a second modified region to become a starting point region for cutting within the object along a second line to cut intersecting the first line to cut such that the second modified region intersects at least a part of the first modified region; and a second step of irradiating the object with the laser light while locating the light-converging point within the object after the first step, so as to form a third modified region to become a starting point region for cutting along the first line to cut within the object between the first modified region and an entrance face of the object where the laser light is incident, and form a fourth modified region to become a starting point region for cutting along the second line to cut within the object between the second modified region and the entrance face such that the fourth modified region intersects at least a part of the third modified region.

The height of modified regions blocking the laser light in the thickness direction of the object upon irradiation with the laser light is higher in this laser processing method than in the case where the second and fourth modified regions are formed after forming the first and third modified regions. Consequently, the unmodified region free of the modified region is hard to occur, whereby the object can be cut with a high precision.

The order of forming the first and second modified regions in the first step is not restricted in particular. The order of forming the third and fourth modified regions in the second step is not restricted in particular.

Preferably, the second modified region is formed after the first modified region is formed in the first step, whereas the fourth modified region is formed after the third modified region is formed in the second step.

Preferably, the second modified region is formed after the first modified region is formed in the first step, whereas the third modified region is formed after the fourth modified region is formed in the second step.

In the laser processing method, the laser light is moved along the second line to cut at any of times when forming the second and fourth modified regions. This makes it unnecessary to change the moving direction of laser light between the first and second steps. As a consequence, the fourth modified region can be formed in a short time with a high precision.

Preferably, first entrance face information of the entrance face is recorded when forming the first modified region, the third modified region is formed while using the first entrance face information, second entrance face information of the entrance face is recorded when forming the second modified region, and the fourth modified region is formed while using the second entrance face information. Here, "entrance face information" refers to height information of irregularities existing in the entrance face in the thickness direction of the object, for example.

In this case, the third modified region can be formed into substantially the same shape as that of the first modified region in conformity to irregularities and undulations of the entrance face. Similarly, the fourth modified region can be formed into substantially the same shape as that of the second modified region in conformity to irregularities and undulations of the entrance face.

It will also be preferred if at least one of the first to fourth modified regions is constituted by a plurality of rows of modified regions aligned in the thickness direction of the object.

In this case, each of the first to fourth modified regions can be made higher in the thickness direction of the object.

Preferably, at least one set of the first and second modified regions and the third and fourth modified regions are constituted by the same number of rows of modified regions aligned in the thickness direction of the object. Its examples include cases where (i) the first and second modified regions are constituted by the same number of rows of modified regions aligned in the thickness direction of the object; (ii) the third and fourth modified regions are constituted by the same number of rows of modified regions aligned in the thickness direction of the object; and (iii) the first and second modified regions are constituted by the same number of modified regions aligned in the thickness direction of the object, while the third and fourth modified regions are constituted by the same number of rows of modified regions aligned in the thickness direction of the object.

The case (i) makes it easier for the first and second modified regions to have the same height in the thickness direction of the object. The case (ii) makes it easier for the third and fourth modified regions to have the same height in the thickness direction of the object. The case (iii) makes it easier for the first and second modified regions to have the same height in the thickness direction of the object, and makes it easier for the third and fourth modified regions to have the same height in the thickness direction of the object.

EFFECT OF THE INVENTION

The present invention can provide a laser processing method by which an object to be processed can be cut with a high precision.

EXPLANATIONS OF NUMERALS OR LETTERS

1 . . . object to be processed; 1a . . . entrance face; 3 . . . front face; 4a . . . cross section (side face); 5 . . . line to cut; 5a . . . first line to cut; 5b . . . second line to cut; 7 . . . modified region; 71 . . . first modified region; 71a to 71f . . . a plurality of rows of modified regions; 72 . . . second modified region; 73 . . . fourth modified region; 74 . . . third modified region; 8 . . . starting point region for cutting; 13 . . . molten processed region; L . . . laser light; P . . . light-converging point.

BEST MODES FOR CARRYING OUT THE INVENTION

In the following, a preferred embodiment of the present invention will be explained in detail with reference to the drawings. The laser processing method in accordance with this embodiment utilizes a phenomenon of multiphoton absorption in order to form a modified region within an object to be processed. Therefore, a laser processing method for forming a modified region by the multiphoton absorption will be explained first.

A material becomes transparent when its absorption bandgap $E_G$ is greater than photon energy hv. Hence, a condition under which absorption occurs in the material is $hv > E_G$. However, even when optically transparent, the material generates absorption under a condition of $nhv > E_G$ (where n=2, 3, 4, . . . ) if the intensity of laser light becomes very high. This phenomenon is known as multiphoton absorption. In the case of pulsed waves, the intensity of laser light is determined by the peak power density (W/cm$^2$) of laser light at a light-converging point. The multiphoton absorption occurs under a condition where the peak power density is $1 \times 10^8$ (W/cm$^2$) or greater, for example. The peak power density is determined by (energy of laser light at the light-converging point per pulse)/(beam spot cross-sectional area of laser light×pulse width). In the case of continuous waves, the intensity of laser light is determined by the field intensity (W/cm$^2$) of laser light at the light-converging point.

Figure 1:
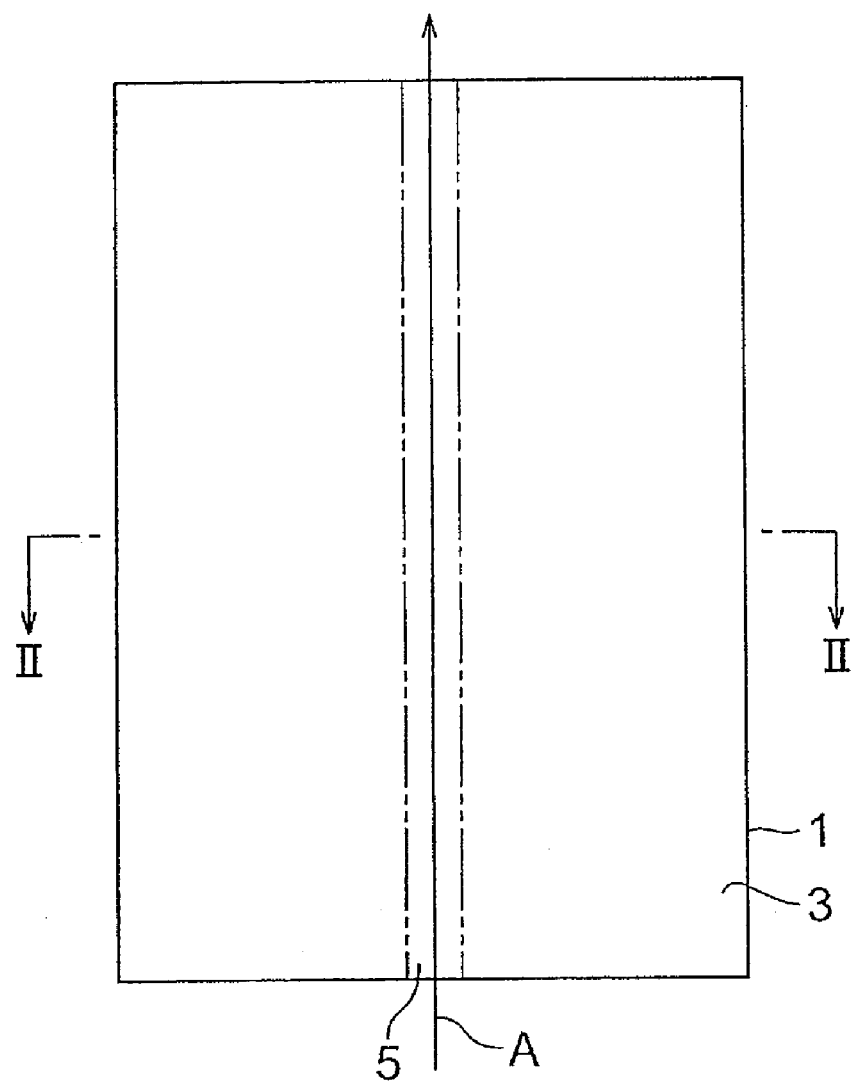
FIG. 1 is a plan view of an object to be processed during laser processing by the laser processing method in accordance with an embodiment.
Figure 2:
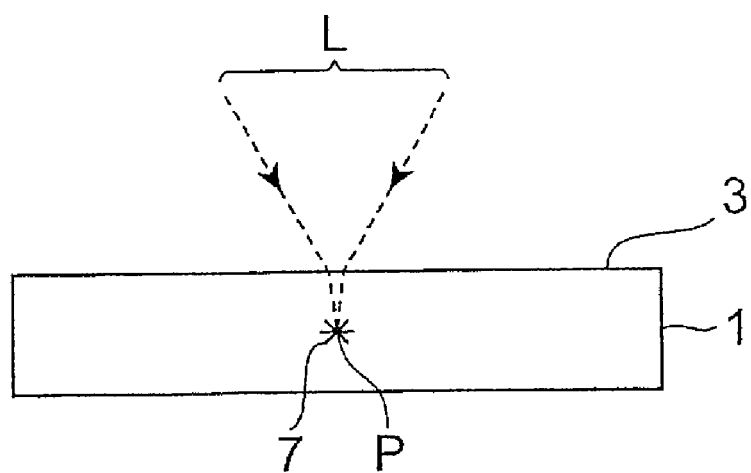
FIG. 2 is a sectional view of the object taken along the line II-II of FIG. 1.

The principle of the laser processing method in accordance with the embodiment using such multiphoton absorption will be explained with reference to FIGS. 1 to 6. As shown in FIGS. 1 and 2, on a front face 3 of a wafer-like (planar) object to be processed, a line to cut 5 for cutting the object 1 exists. The line to cut 5 is a virtual line extending straight. As shown in FIG. 2, the laser processing in accordance with this embodiment irradiates the object 1 with laser light L while locating a light-converging point P within the object 1 under a condition generating multiphoton absorption, so as to form a modified region 7. The light-converging point P is a position at which the laser light L is converged. The line to cut 5 may be curved instead of being straight, and may be a line actually drawn on the object 1 without being restricted to virtual lines.

Figure 3:
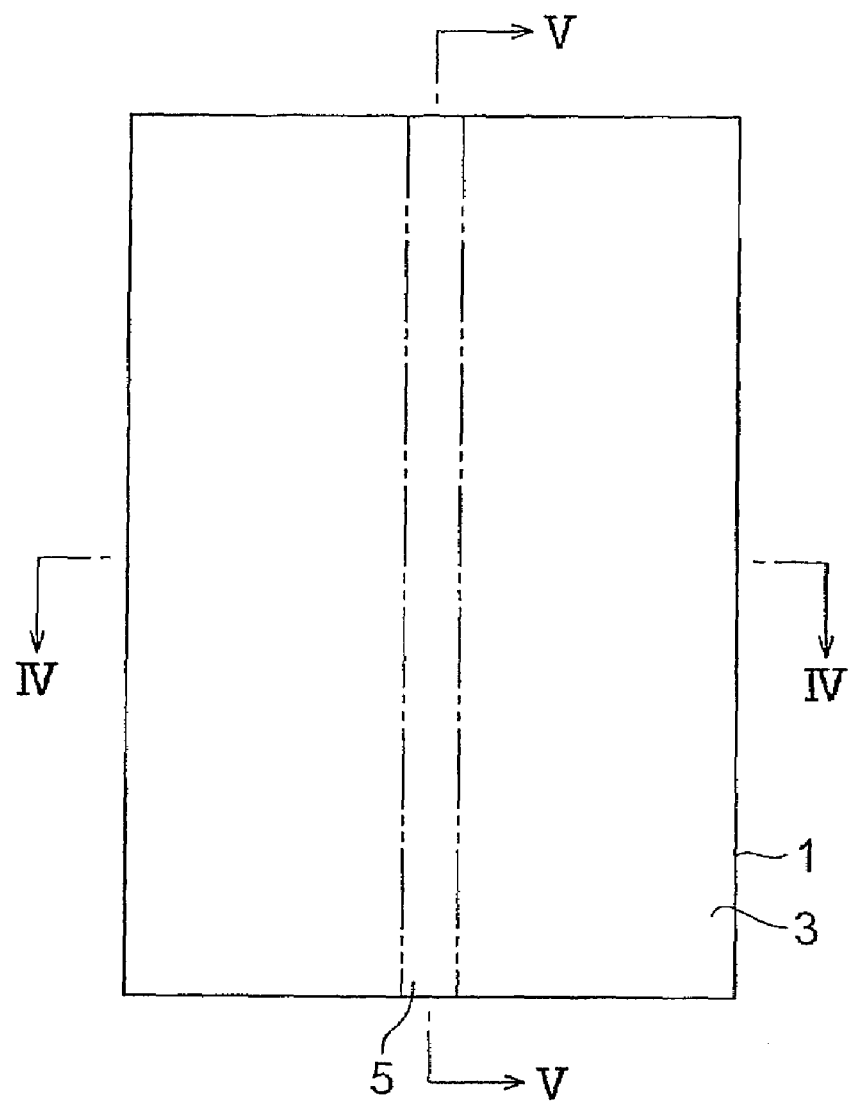
FIG. 3 is a plan view of the object after the laser processing by the laser processing method in accordance with the embodiment.
Figure 4:
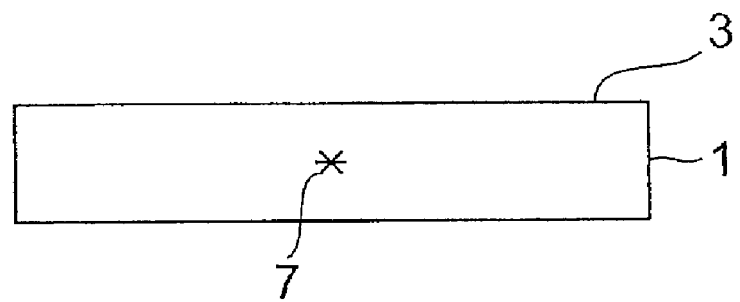
FIG. 4 is a sectional view of the object taken along the line IV-IV of FIG. 3.
Figure 5:
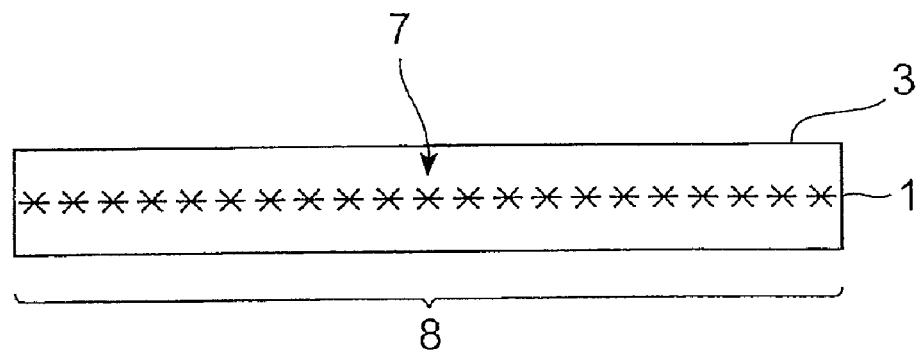
FIG. 5 is a sectional view of the object taken along the line V-V of FIG. 3.

The laser light L is relatively moved along the line to cut 5 (i.e., in the direction of arrow A in FIG. 1), so as to shift the light-converging point P along the line to cut 5. Consequently, as shown in FIGS. 3 to 5, the modified region 7 is formed along the line to cut 5 only within the object 1, whereas a starting point region for cutting 8 is formed by the modified region 7. Here, the starting point region for cutting 8 refers to a region which becomes a start point for cutting (fracturing) at the time when the object 1 is cut. The starting point region for cutting 8 may be made by the modified region 7 formed continuously or modified regions 7 formed intermittently.

In the laser processing method in accordance with this embodiment, the modified region 7 is not formed by the heat generated from the object 1 absorbing the laser light L. The laser light L is transmitted through the object 1, so as to generate multiphoton absorption therewithin, thereby forming the modified region 7. Therefore, the front face 3 of the object 1 hardly absorbs the laser light L and does not melt.

Figure 6:
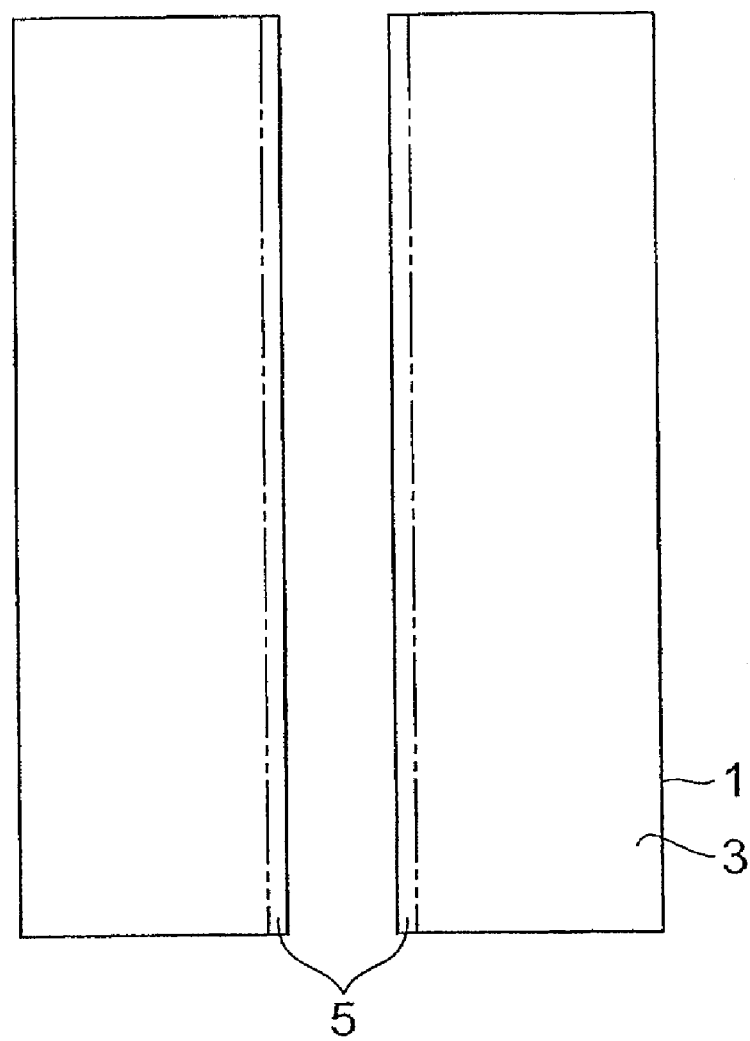
FIG. 6 is a plan view of the object cut by the laser processing method in accordance with the embodiment.

When the starting point region for cutting 8 is formed within the object 1, fractures are likely to start from the starting point region for cutting 8, whereby the object 1 can be cut with a relatively small force as shown in FIG. 6. Therefore, the object 1 can be cut with a high precision without generating unnecessary fractures greatly deviating from the line to cut 5 on the front face 3 of the object 1.

There seem to be the following two ways of cutting the object 1 from the starting point region for cutting 8 acting as the start point. The first case is where an artificial force is applied to the object 1 after forming the starting point region for cutting 8, so that the object 1 fractures from the starting point region for cutting 8, whereby the object 1 is cut. This is the cutting in the case where the object 1 has a large thickness, for example. Applying an artificial force refers to exerting a bending stress or shear stress to the object 1 along the starting point region for cutting, or generating a thermal stress by applying a temperature difference to the object 1, for example. The other case is where the forming of the starting point region for cutting 8 causes the object 1 to fracture naturally in its cross-sectional direction (thickness direction) from the starting point region for cutting 8 acting as a start point, thereby cutting the object 1. This becomes possible if the starting point region for cutting is formed by one row of modified region 7 when the object 1 has a small thickness, or if the starting point region for cutting 8 is formed by a plurality of rows of modified regions 7 in the thickness direction when the object 1 has a large thickness. Even in this naturally fracturing case, fractures do not extend onto the front face 3 at a portion corresponding to an area not formed with the starting point region for cutting 8, so that only the portion corresponding to the area formed with the starting point region for cutting 8 can be cleaved, whereby cleavage can be controlled well. Such a cleaving method with a favorable controllability is quite effective, since the object 1 such as silicon wafer has recently been apt to decrease its thickness.

The modified region formed by multiphoton absorption in this embodiment encompasses the following cases (1) to (3):

(1) Case where the modified region is a crack region including one crack or a plurality of cracks An object to be processed (e.g., glass or a piezoelectric material made of LiTaO$_3$) is irradiated with laser light while locating a light-converging point therewithin under a condition with a field intensity of at least $1 \times 10^8$ (W/cm$^2$) at the light-converging point and a pulse width of 1 μs or less. This magnitude of pulse width is a condition under which a crack region can be formed only within the object while generating multiphoton absorption without causing unnecessary damages on the front face of the object. This generates a phenomenon of optical damage by multiphoton absorption within the object. This optical damage induces a thermal distortion within the object, thereby forming a crack region therewithin. The upper limit of field intensity is $1 \times 10^{12}$ (W/cm$^2$), for example. The pulse width is preferably 1 to 200 ns, for example. The forming of a crack region by multiphoton absorption is disclosed, for example, in "Internal Marking of Glass Substrate with Solid-state Laser", Proceedings of the 45th Laser Materials Processing Conference (December, 1998), pp. 23-28.

The inventors determined the relationship between field intensity and crack size by an experiment. The following are conditions of the experiment.

(A) Object to be processed: Pyrex (registered trademark) glass (with a thickness of 700 μm)

(B) Laser
light source: semiconductor laser pumping Nd:YAG laser
wavelength: 1064 nm
laser light spot cross-sectional area: $3.14 \times 10^{-8}$ cm$^2$
oscillation mode: Q-switched pulse
repetition frequency: 100 kHz
pulse width: 30 ns
output: output<1 mJ/pulse
laser light quality: TEM$_{00}$
polarizing property: linear polarization (C) Condenser lens
transmittance at a laser light wavelength: 60%

(D) Moving rate of the mounting table mounting the object: 100 mm/sec

The laser light quality of TEM$_{00}$ means that the light-converging characteristic is so high that convergence to about the wavelength of laser light is possible.

Figure 7:
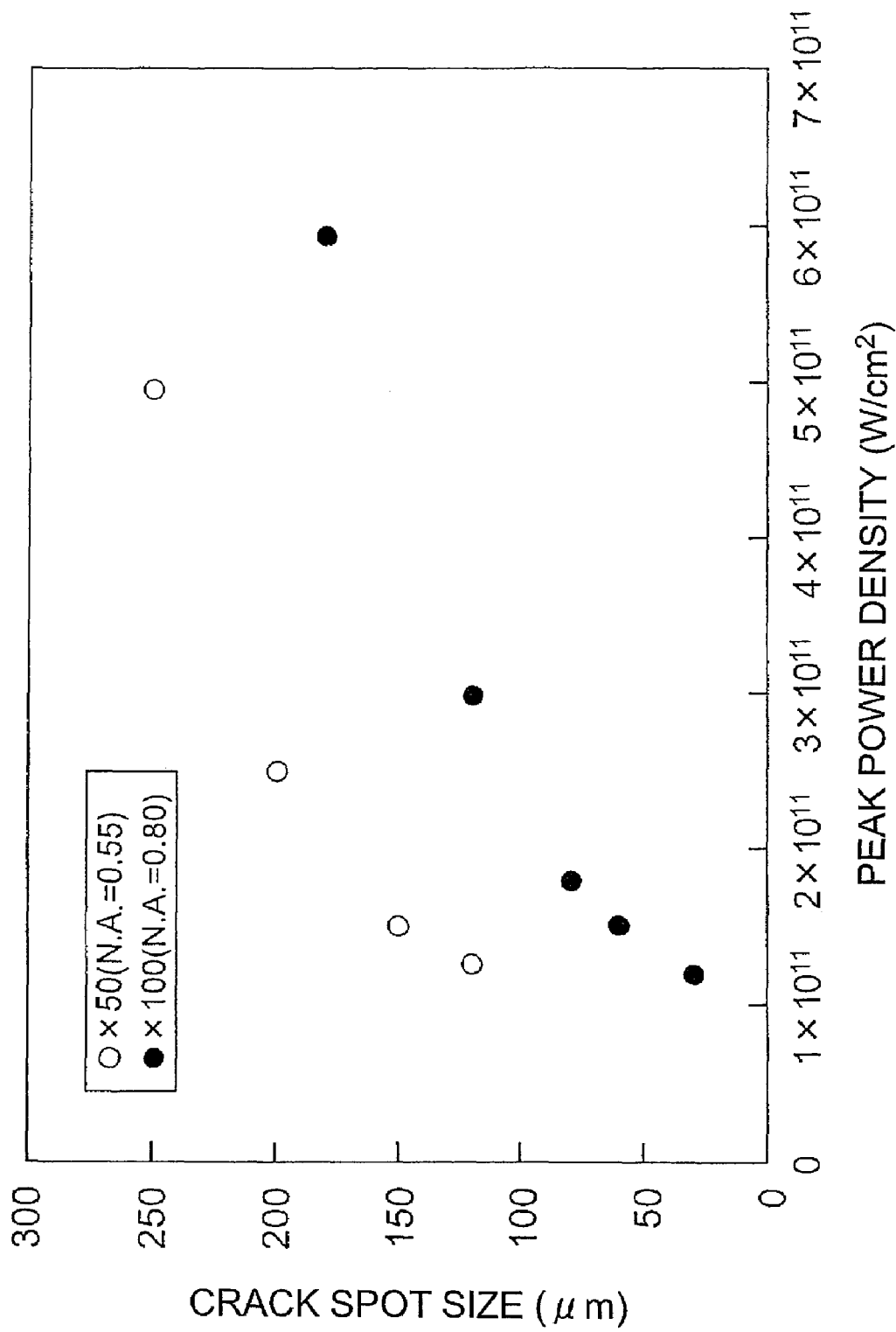
FIG. 7 is a graph showing relationships between the field intensity and crack spot size in the laser processing method in accordance with the embodiment.

FIG. 7 is a graph showing the results of the above-mentioned experiment. The abscissa indicates the peak power density. Since the laser light is pulsed laser light, the field intensity is represented by the peak power density. The ordinate indicates the size of a crack part (crack spot) formed within the object by one pulse of laser light. Crack spots gather to yield a crack region. The crack spot size is the size of a part yielding the maximum length among forms of crack spots. Data represented by black circles in the graph refer to a case where the condenser lens (C) has a magnification of ×100 and a numerical aperture (NA) of 0.80. On the other hand, data represented by whitened circles in the graph refer to a case where the condenser lens (C) has a magnification of ×50 and a numerical aperture (NA) of 0.55. Crack spots are seen to occur within the object from when the peak power density is about $10^{11}$ (W/cm$^2$) and become greater as the peak power density increases.

Figure 8:
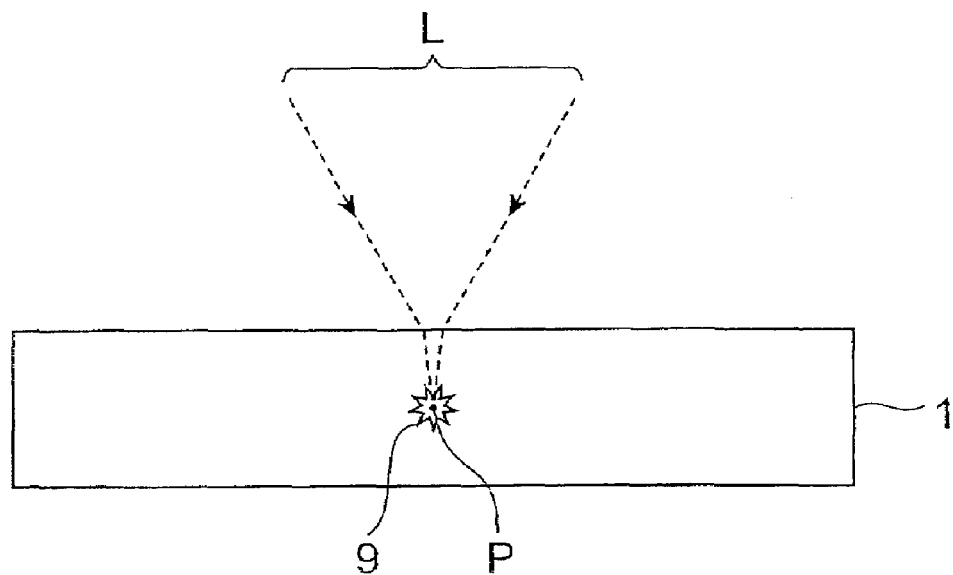
FIG. 8 is a sectional view of the object in a crack region forming step when the laser processing method in accordance with the embodiment is used for cutting the object.
Figure 9:
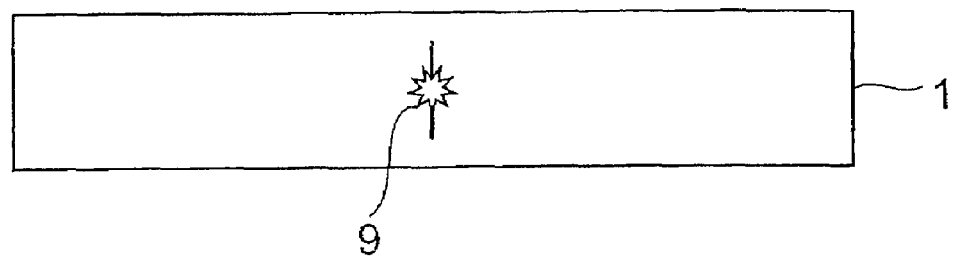
FIG. 9 is a sectional view of the object in a crack growing step when the laser processing method in accordance with the embodiment is used for cutting the object.
Figure 10:
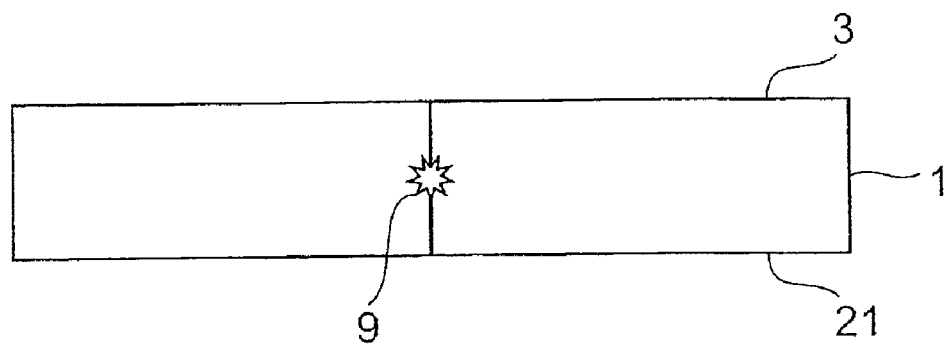
FIG. 10 is a sectional view of the object in the crack growing step when the laser processing method in accordance with the embodiment is used for cutting the object.
Figure 11:
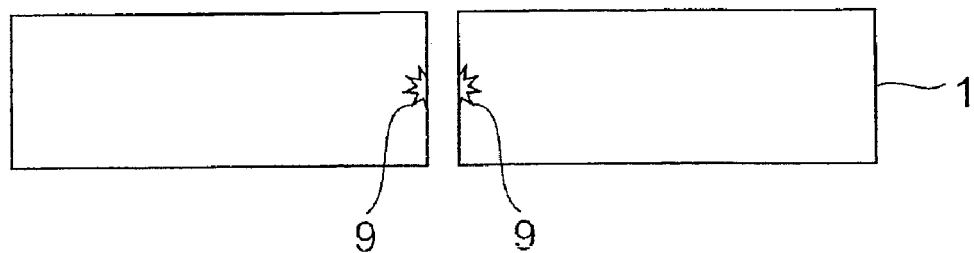
FIG. 11 is a sectional view of the object in a cutting step when the laser processing method in accordance with the embodiment is used for cutting the object.

A mechanism by which the objet to be processed is cut by forming a crack region will now be explained with reference to FIGS. 8 to 11. As shown in FIG. 8, the object 1 is irradiated with laser light L while the light-converging point P is located within the object 1 under a condition where multiphoton absorption occurs, so as to form a crack region 9 therewithin along a line to cut. The crack region 9 is a region containing one crack or a plurality of cracks. Thus formed crack region 9 yields a starting point region for cutting. As shown in FIG. 9, a crack further grows from the crack region 9 acting as a start point (i.e., from the starting point region for cutting acting as a start point), and reaches the front face 3 and rear face 21 of the object 1 as shown in FIG. 10, whereby the object 1 fractures and is consequently cut as shown in FIG. 11. The crack reaching the front face 3 and rear face 21 of the object 1 may grow naturally or as a force is applied to the object 1.

(2) Case where the modified region is a molten processed region

An object to be processed (e.g., semiconductor material such as silicon) is irradiated with laser light while locating a light-converging point within the object under a condition with a field intensity of at least $1 \times 10^8$ (W/cm$^2$) at the light-converging point and a pulse width of 1 μs or less. As a consequence, the inside of the object is locally heated by multiphoton absorption. This heating forms a molten processed region within the object. The molten processed region encompasses regions once molten and then re-solidified, regions just in a molten state, and regions in the process of being re-solidified from the molten state, and can also be referred to as a region whose phase has changed or a region whose crystal structure has changed. The molten processed region may also be referred to as a region in which a certain structure has changed to another structure among monocrystal, amorphous, and polycrystal structures. For example, it means a region having changed from the monocrystal structure to the amorphous structure, a region having changed from the monocrystal structure to the polycrystal structure, or a region having changed from the monocrystal structure to a structure containing amorphous and polycrystal structures. When the object to be processed is of a silicon monocrystal structure, the molten processed region is an amorphous silicon structure, for example. The upper limit of field intensity is $1 \times 10^{12}$ (W/cm$^2$), for example. The pulse width is preferably 1 to 200 ns, for example.

By an experiment, the inventors verified that a molten processed region was formed within a silicon wafer. The following are conditions of the experiment.

(A) Object to be processed: silicon wafer (with a thickness of 350 μm and an outer diameter of 4 inches)

(B) Laser
light source: semiconductor laser pumping Nd:YAG laser
wavelength: 1064 nm
laser light spot cross-sectional area: $3.14 \times 10^{-8}$ cm$^2$
oscillation mode: Q-switched pulse
repetition frequency: 100 kHz
pulse width: 30 ns
output: 20 μJ/pulse
laser light quality: TEM$_{00}$
polarizing property: linear polarization (C) Condenser lens
magnification: ×50
N.A.: 0.55
transmittance at a laser light wavelength: 60%

(D) Moving rate of the mounting table mounting the object: 100 mm/sec

Figure 12:
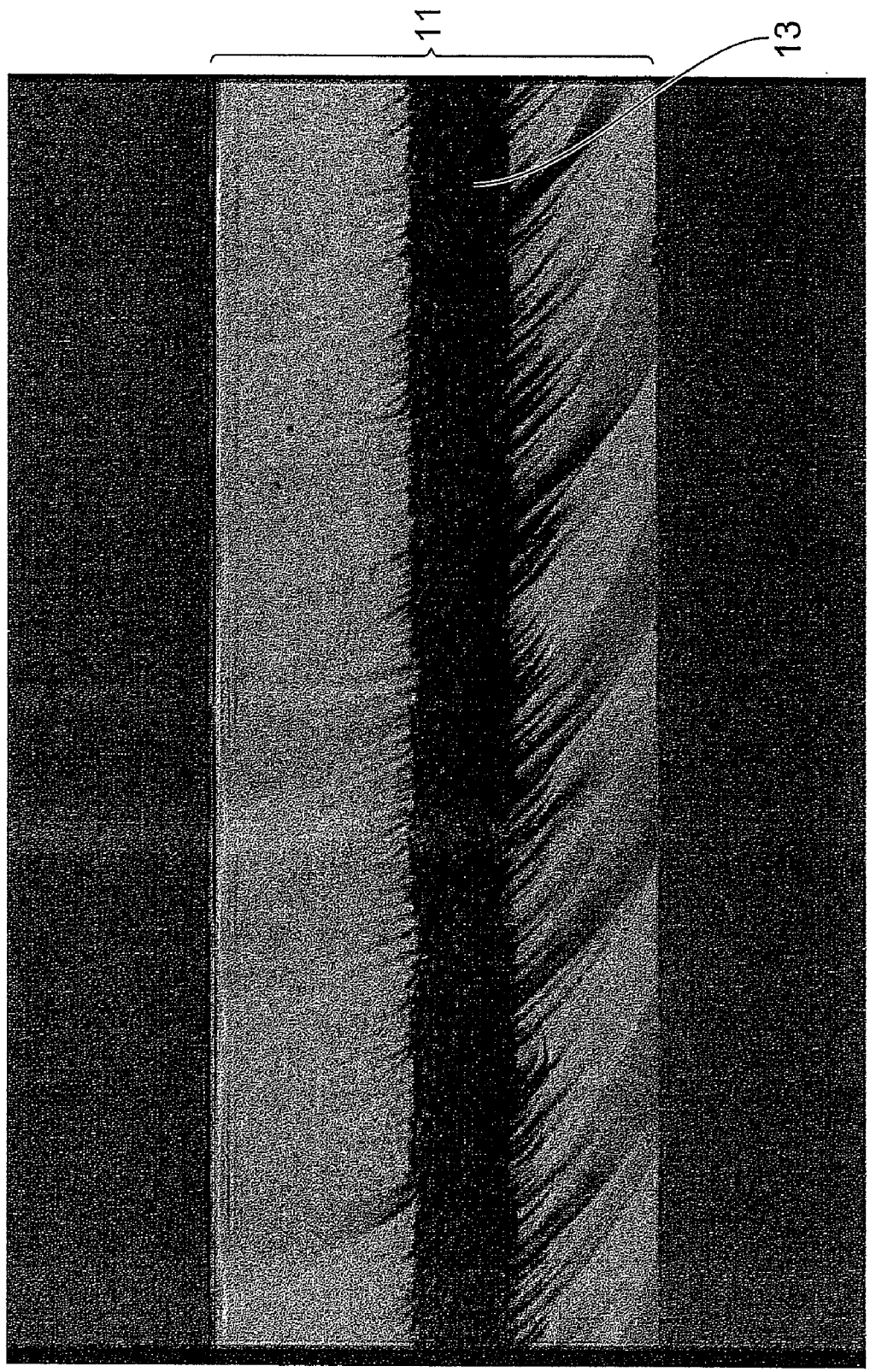
FIG. 12 is a view showing a photograph of a cross section of a part of a silicon wafer cut by the laser processing method in accordance with the embodiment.

FIG. 12 is a view showing a photograph of a cross section of a part of a silicon wafer cut by laser processing under the conditions mentioned above. A molten processed region 13 is formed within the silicon wafer 11. The molten processed region 13 formed under the above-mentioned conditions has a size of about 100 μm in the thickness direction.

Figure 13:
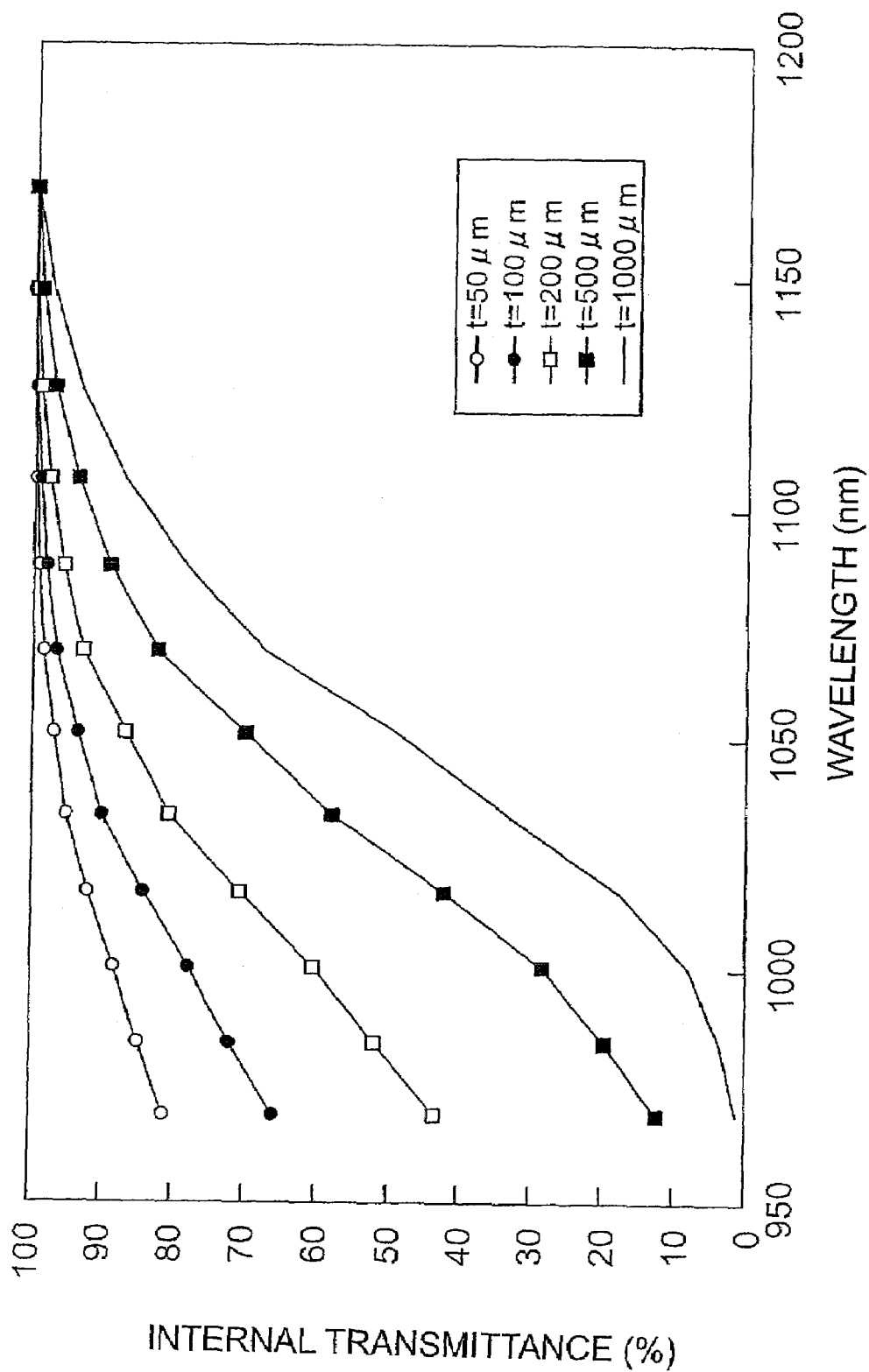
FIG. 13 is a graph showing relationships between the laser light wavelength and the transmittance within the silicon substrate in the laser processing method in accordance with the embodiment.

The fact that the molten processed region 13 is formed by multiphoton absorption will now be explained. FIG. 13 is a graph showing relationships between the laser light wavelength and the transmittance within the silicon substrate. Here, the respective reflected components on the front and rear sides of the silicon substrate are eliminated, so as to show the internal transmittance alone. The respective relationships are shown in the cases where the thickness t of the silicon substrate is 50 μm, 100 μm, 200 μm, 500 μm, and 1000 μm.

For example, at the Nd:YAG laser wavelength of 1064 nm, the laser light appears to be transmitted through the silicon substrate by at least 80% when the silicon substrate has a thickness of 500 μm or less. Since the silicon wafer 11 shown in FIG. 12 has a thickness of 350 μm, the molten processed region 13 caused by multiphoton absorption is formed near the center of the silicon wafer 11, i.e., at a part distanced from the front face by 175 μm. The transmittance in this case is 90% or more with reference to a silicon wafer having a thickness of 200 μm, whereby the laser light is absorbed only slightly within the silicon wafer 11 but is substantially transmitted therethrough. This means that the molten processed region 13 is formed within the silicon wafer 11 not by laser light absorption within the silicon wafer 11 (i.e., not by usual heating with the laser light) but by multiphoton absorption. The forming of a molten processed region by multiphoton absorption is disclosed, for example, in "Silicon Processing Characteristic Evaluation by Picosecond Pulse Laser", Preprints of the National Meetings of Japan Welding Society, Vol. 66 (April, 2000), pp. 72-73.

A fracture is generated in a silicon wafer from a starting point region for cutting formed by a molten processed region, acting as a start point, toward a cross section, and reaches the front and rear faces of the silicon wafer, whereby the silicon wafer is cut. The fracture reaching the front and rear faces of the silicon wafer may grow naturally or as a force is applied to the silicon wafer. The fracture naturally growing from the starting point region for cutting to the front and rear faces of the silicon wafer encompasses a case where the fracture grows from a state where the molten processed region forming the starting point region for cutting is molten and a case where the fracture grows when the molten processed region forming the starting point region for cutting is re-solidified from the molten state. In either case, the molten processed region is formed only within the silicon wafer, and thus is present only within the cross section after cutting as shown in FIG. 12. When a starting point region for cutting is formed within the object by a molten processed region as such, unnecessary fractures deviating from a line of a starting point region for cutting are harder to occur at the time of cleaving, whereby cleavage control becomes easier.

(3) Case where the modified region is a refractive index change region

An object to be processed (e.g., glass) is irradiated with laser light while locating a light-converging point within the object under a condition with a field intensity of at least $1 \times 10^8$ (W/cm$^2$) at the light-converging point and a pulse width of 1 ns or less. When multiphoton absorption is generated within the object with a very short pulse width, the energy caused by multiphoton absorption is not converted into thermal energy, whereby an eternal structure change such as ion valence change, crystallization, or orientation polarization is induced within the object, thus forming a refractive index change region. The upper limit of field intensity is $1 \times 10^{12}$ (W/cm$^2$), for example. The pulse width is preferably 1 ns or less, for example, more preferably 1 ps or less. The forming of a refractive index change region by multiphoton absorption is disclosed, for example, in "Forming of Photoinduced Structure within Glass by Femtosecond Laser Irradiation", Proceedings of the 42nd Laser Materials Processing Conference (November 1997), pp. 105-111.

While the cases (1) to (3) are explained in the foregoing as a modified region formed by multiphoton absorption, a starting point region for cutting may be formed as follows while taking account of the crystal structure of a wafer-like object to be processed, its cleavage characteristic, and so forth, whereby the object can be cut with a high precision by a smaller force from the starting point region for cutting acting as a start point.

Namely, in the case of a substrate made of a monocrystal semiconductor having a diamond structure such as silicon, it will be preferred if a starting point region for cutting is formed in a direction extending along a (111) plane (first cleavage plane) or a (110) plane (second cleavage plane). In the case of a substrate made of a III-V family compound semiconductor of sphalerite structure such as GaAs, it will be preferred if a starting point region for cutting is formed in a direction extending along a (110) plane. In the case of a substrate having a crystal structure of hexagonal system such as sapphire (Al$_2$O$_3$), it will be preferred if a starting point region for cutting is formed in a direction extending along a (1120) plane (A plane) or a (1100) plane (M plane) while using a (0001) plane (C plane) as a principal plane.

When the substrate is formed with an orientation flat in a direction to be formed with the above-mentioned starting point region for cutting (e.g., a direction extending along a (111) plane in a monocrystal silicon substrate) or a direction orthogonal to the direction to be formed with the starting point region for cutting, the starting point region for cutting extending in the direction to be formed therewith can be formed easily and accurately with reference to the orientation flat.

The preferred embodiment of the present invention will now be explained. FIGS. 14(A) to 14(C) and 15(A) to 15(C) are perspective views schematically showing an example of steps of the laser processing method in accordance with this embodiment. In the laser processing method in accordance with this embodiment, it will be preferred if the following first to third steps are successively performed as shown in FIGS. 14(A) to 14(C) and 15(A) to 15(C).

(First Step)

Figure 14:
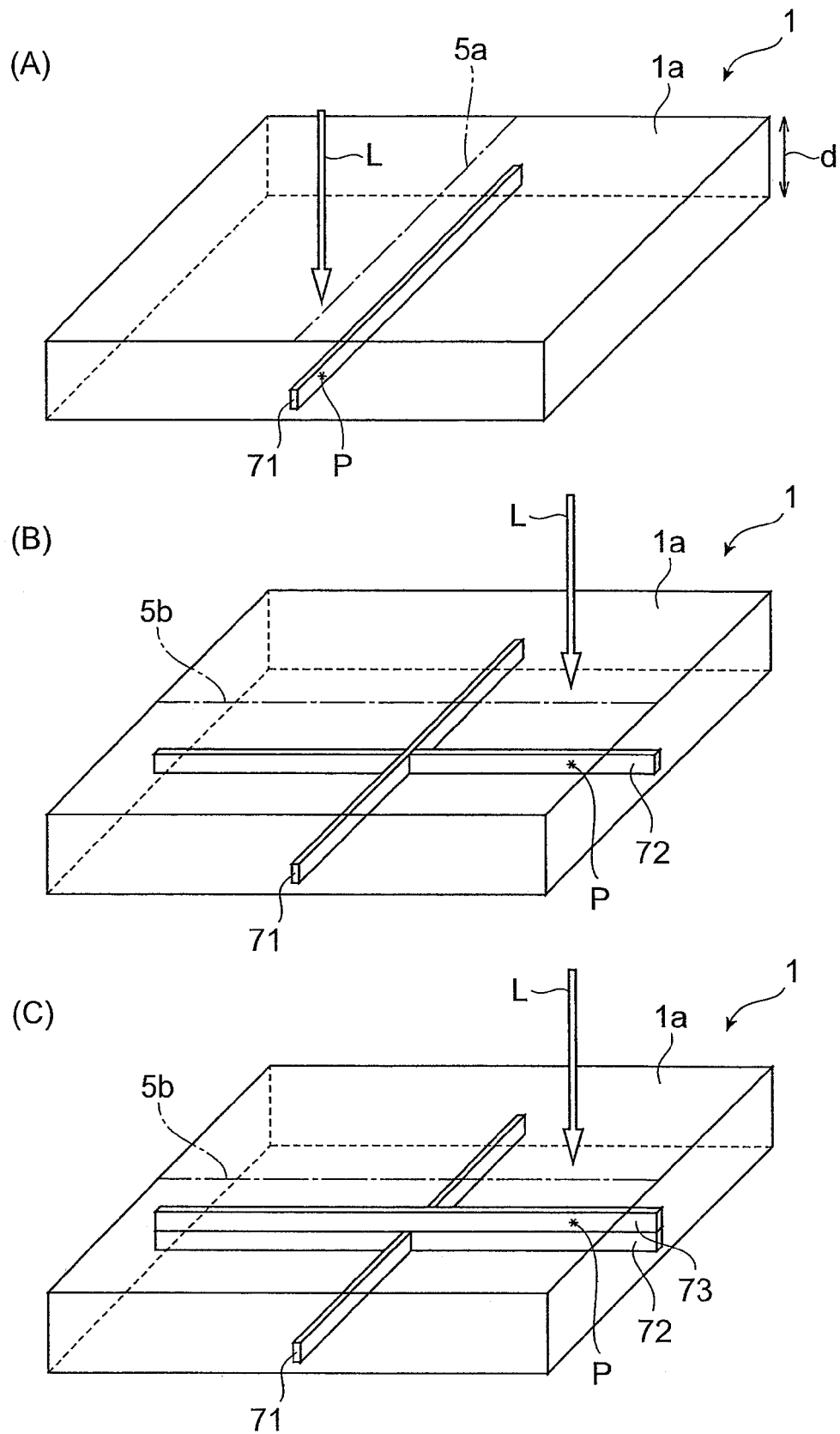
FIG. 14 is a perspective view schematically showing an example of steps in the laser processing method in accordance with the embodiment.

First, a planar object to be processed 1 having a thickness d is irradiated with laser light L while locating a light-converging point P within the object 1, and the laser light L is moved along a first line to cut 5a in the object 1 (see FIG. 14(A)). This causes multiphoton absorption within the object 1, whereby a first modified region 71 to become a start point for cutting can be formed within the object 1 along the line to cut 5a. Specifically, for example, a stage (not depicted) for mounting the object 1 is shifted, so as to move the laser light L relative to the object 1.

Examples of the object 1 include substrates such as silicon wafer and substrates in which a laminate part including a functional device is formed on the front face thereof. Examples of the functional device include semiconductor operating layers formed by crystal growth, light-receiving devices such as photodiodes, light-emitting devices such as laser diodes, and circuit devices formed as circuits. The functional device may be formed on an entrance face 1a of the object 1 or on a side opposite from the entrance face 1a.

After the modified region 71 is formed, the object 1 is irradiated with the laser light L while locating the light-converging point P within the object 1, and the laser light L is moved along a second line to cut 5b intersecting the line to cut 5a (see FIG. 14(B)). This causes multiphoton absorption within the object 1, whereby a second modified region 72 to become a start point for cutting can be formed within the object 1 along a line to cut 5b so as to intersect at least a part of the modified region 71. The moving direction of the laser light L can be changed by rotating the stage (not depicted) for mounting the object 1 by 90°, for example.

(Second Step)

After the modified region 72 is formed, the object 1 is irradiated with the laser light L while locating the light-converging point P within the object 1 between the modified region 72 and the entrance face 1a, and the laser light L is moved along the line to cut 5b (see FIG. 14(C)). This causes multiphoton absorption within the object 1, whereby a fourth modified region 73 to become a start point for cutting can be formed within the object 1 between the modified region 72 and the entrance face 1a along the line to cut 5b. Namely, the modified region 73 is provided on the modified region 72. The modified regions 72, 73 may be disposed so as to be separated from each other.

Figure 15:
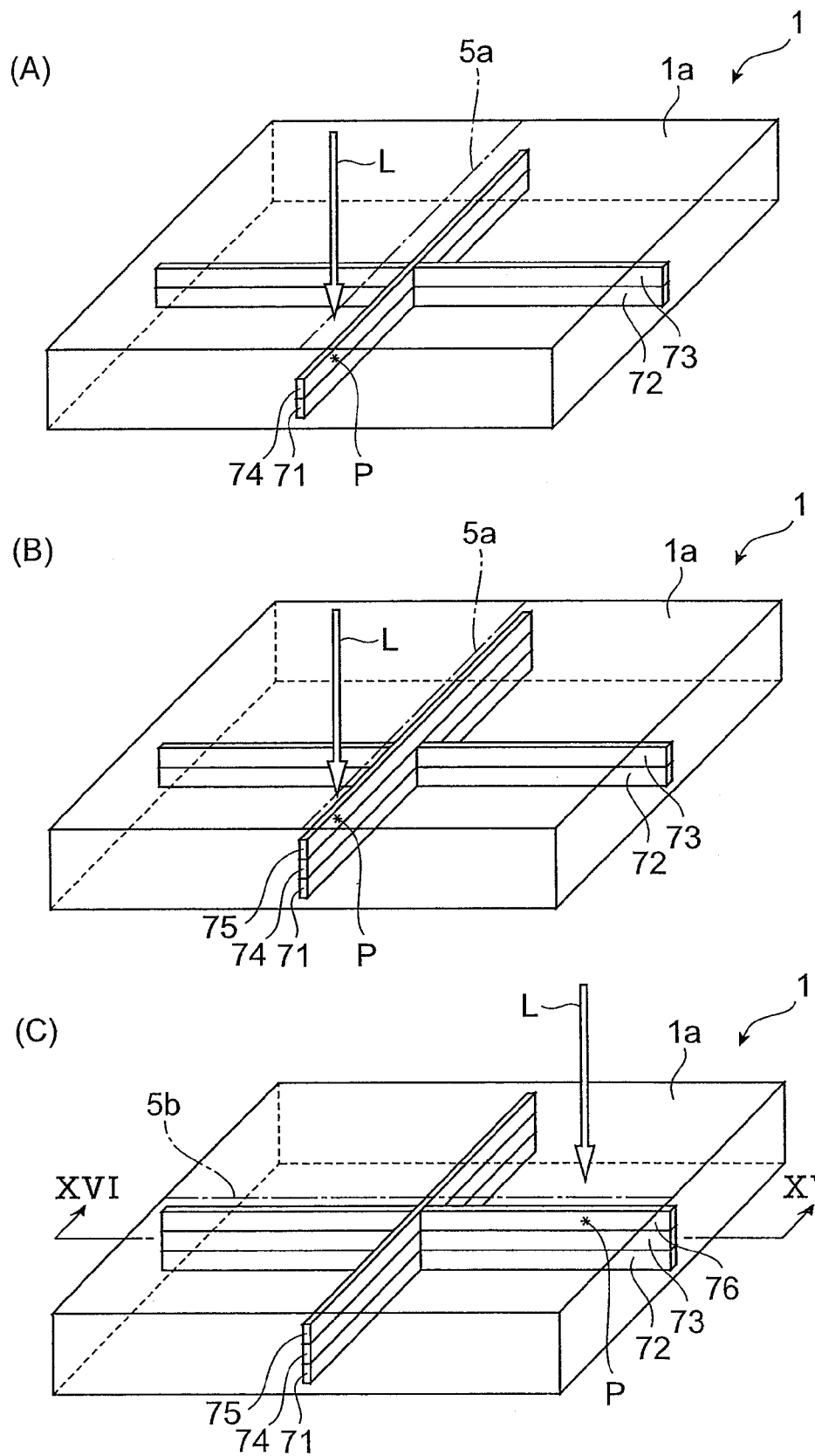
FIG. 15 is a perspective view schematically showing an example of steps in the laser processing method in accordance with the embodiment.

After the modified region 73 is formed, the object 1 is irradiated with the laser light L while locating the light-converging point P within the object 1 between the modified region 71 and the entrance face 1a, and the laser light L is moved along the line to cut 5a (see FIG. 15(A)). This causes multiphoton absorption within the object 1, whereby a third modified region 74 to become a start point for cutting can be formed within the object 1 between the modified region 71 and the entrance face 1a along the line to cut 5b so as to intersect at least a part of the modified region 73. Namely, the modified region 74 is provided on the modified region 71. The modified regions 71, 74 may be disposed so as to be separated from each other.

(Third Step)

After the modified region 74 is formed, the object 1 is irradiated with the laser light L while locating the light-converging point P within the object 1 between the modified region 74 and the entrance face 1a, and the laser light L is moved along the line to cut 5a (see FIG. 15(B)). This causes multiphoton absorption within the object 1, whereby a modified region 75 to become a start point for cutting can be formed within the object 1 between the modified region 74 and the entrance face 1a along the line to cut 5a. Namely, the modified region 75 is provided on the modified region 74. The modified regions 74, 75 may be disposed so as to be separated from each other.

After the modified region 75 is formed, the object 1 is irradiated with the laser light L while locating the light-converging point P within the object 1 between the modified region 73 and the entrance face 1a, and the laser light L is moved along the line to cut 5b (see FIG. 15(C)). This causes multiphoton absorption within the object 1, whereby a modified region 76 to become a start point for cutting can be formed within the object 1 between the modified region 73 and the entrance face 1a along the line to cut 5b so as to intersect at least a part of the modified region 75. Namely, the modified region 76 is provided on the modified region 73. The modified regions 73, 76 may be disposed so as to be separated from each other.

As with the above-mentioned modified region 7, the modified regions 71 to 76 may be constituted by modified regions formed continuously or modified regions formed intermittently at predetermined intervals. As with the above-mentioned line to cut 5, the lines to cut 5a, 5b may be straight or curved virtual lines or lines actually drawn on the object 1 without being restricted to the virtual lines.

After the modified regions 71 to 76 are formed by way of the above-mentioned first to third steps, an expandable tape (not depicted) may be attached to the object 1, for example, and the object 1 can be cut along the lines to cut 5a, 5b by using an expander (not depicted). The expandable tape may be attached to the object 1 before forming the modified regions 71 to 76.

Figure 16:
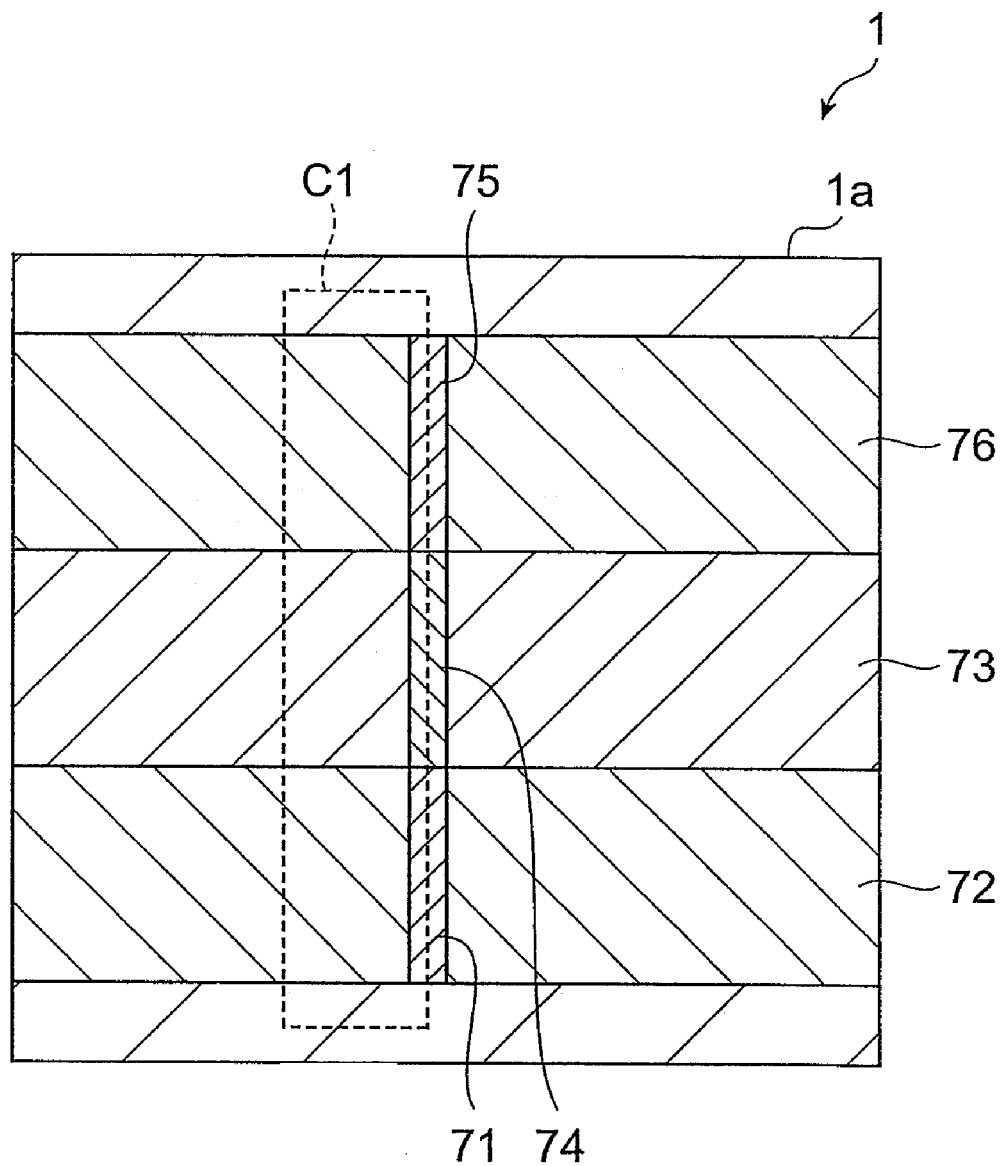
FIG. 16 is a sectional view of the object taken along the line XVI-XVI of FIG. 15(C)
Figure 17:
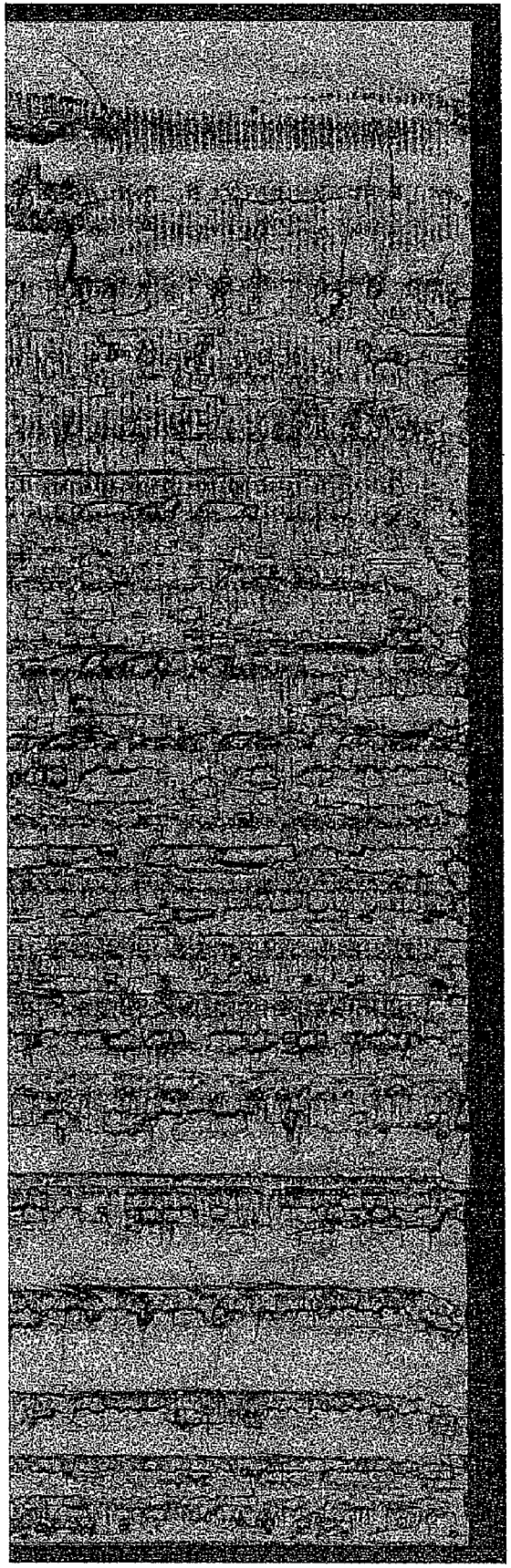
FIG. 17 is a view showing a photograph of a cross section of the object cut by forming modified regions by using the laser processing method in accordance with the embodiment.
Figure 22:
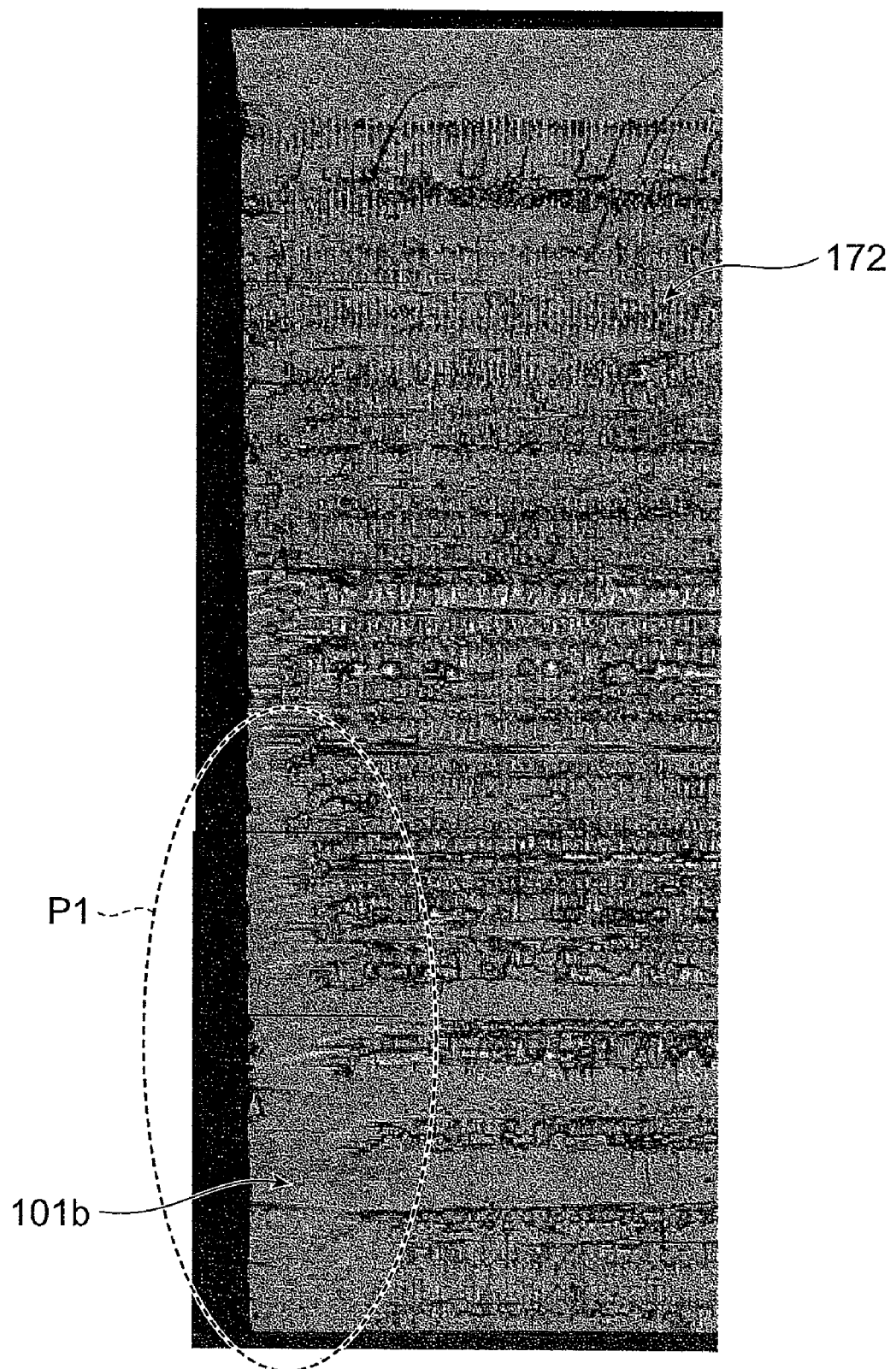
FIG. 22 is a view showing a photograph of a cross section of the object cut by forming the modified regions in the order shown in FIGS. 20(A) and 20(B)
Figure 23:
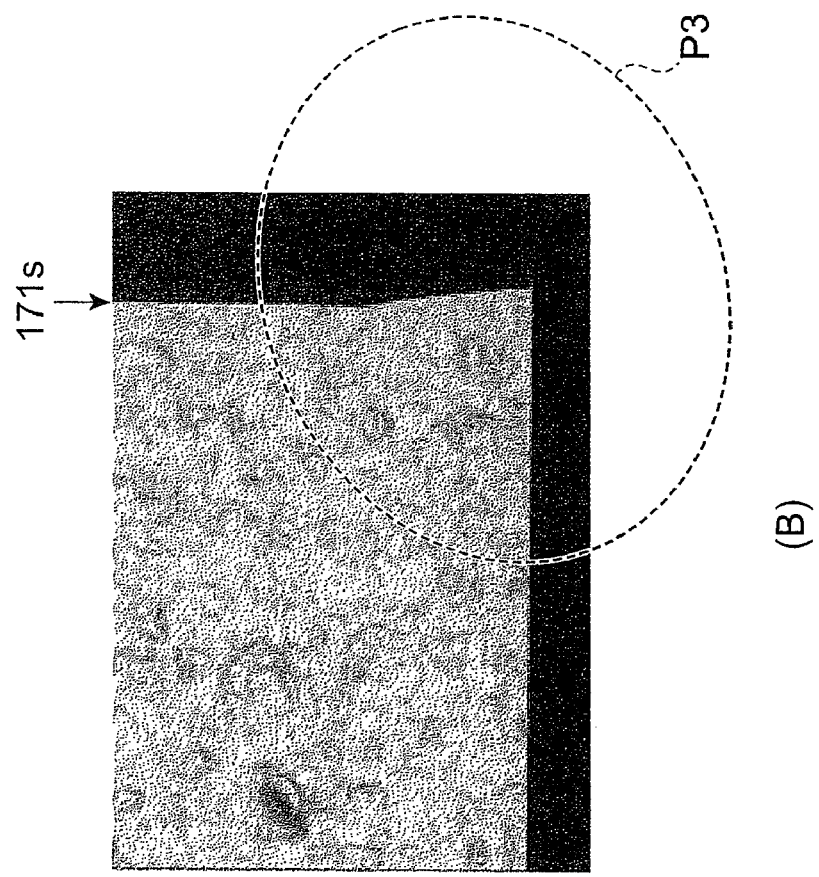
FIG. 23 is a view showing a photograph of a cross section of the object cut by forming the modified regions in the order shown in FIGS. 20(A) and 20(B)
Figure 23:
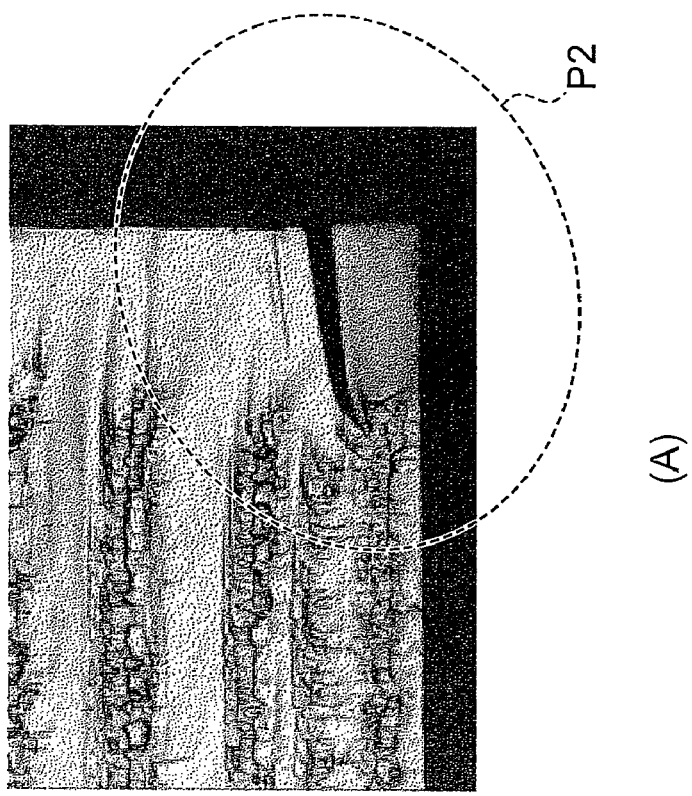

FIG. 16 is a sectional view of the object 1 taken along the line XVI-XVI of FIG. 15(C). As shown in FIG. 16, no unmodified region 101b remains in the object 1. FIG. 17 shows an example of photograph taking region C1 in FIG. 16. FIG. 17 is a view showing a photograph of a cross section of the object 1 cut by forming the modified regions 71 to 76 by using the laser processing method in accordance with the embodiment. No region corresponding to the unmodified region 101b seen within the region P1 in FIG. 22 is found in FIG. 17.

Figure 20:
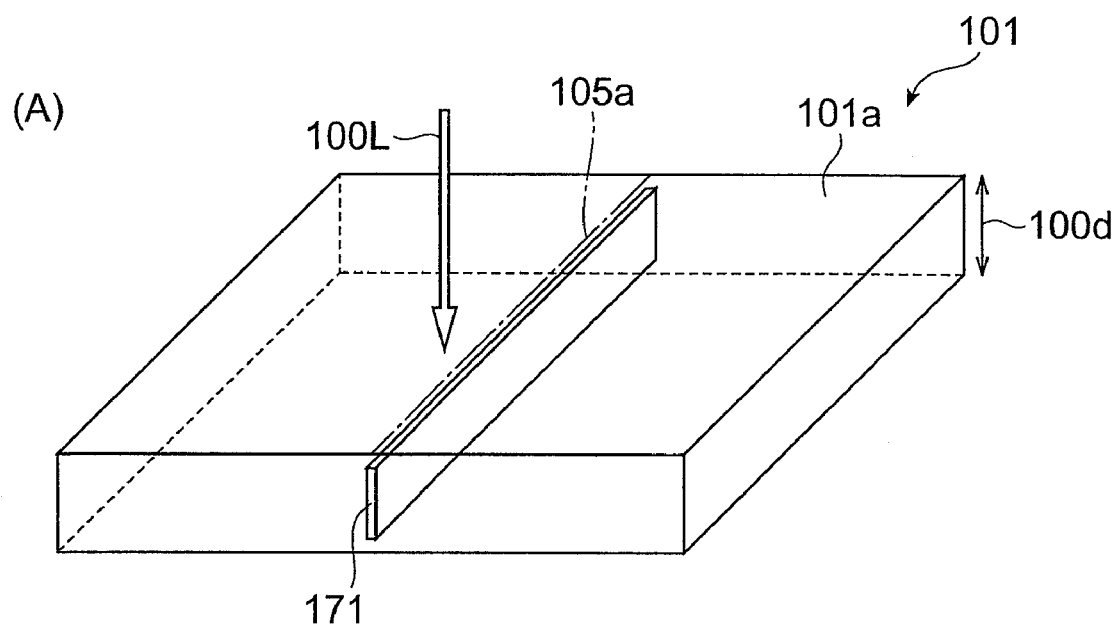
FIG. 20 is a schematic view for explaining an example of order of forming modified regions within the object.
Figure 20:
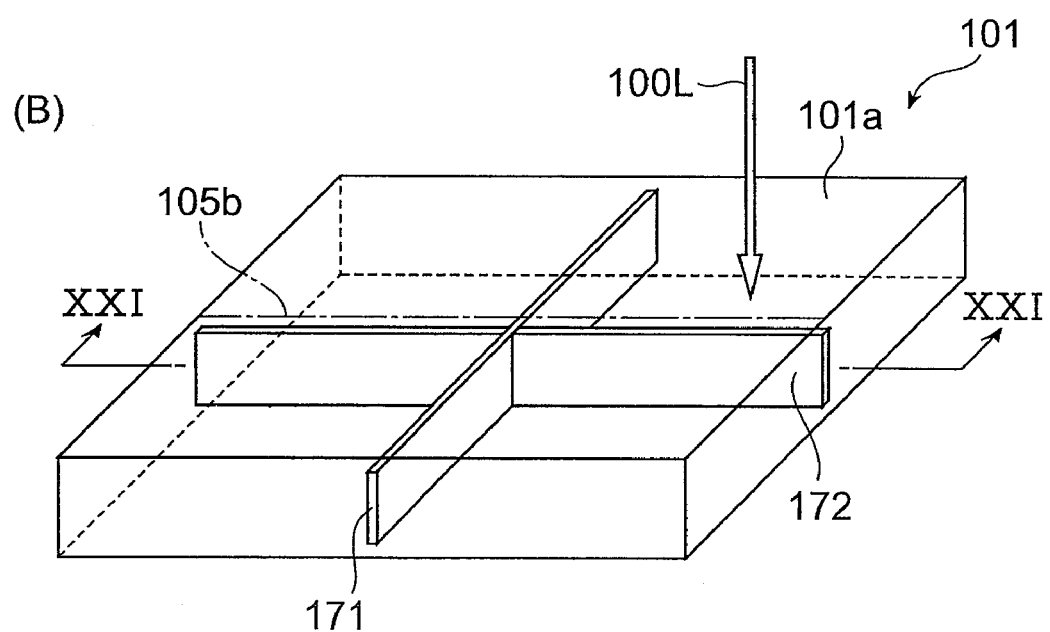
Figure 21:
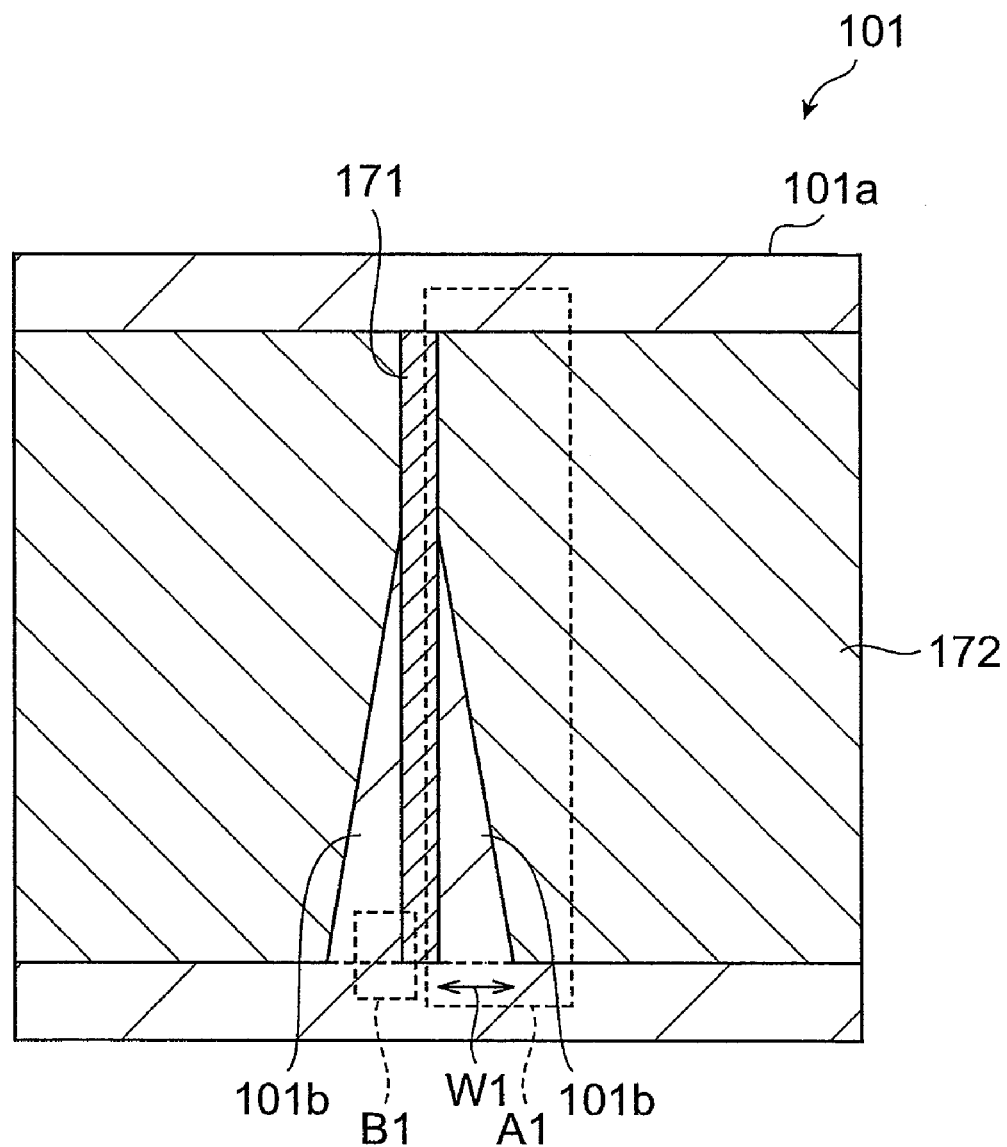
FIG. 21 is a sectional view of the object taken along the line XXI-XXI of FIG. 20(B)

The height of modified regions blocking the laser light in the thickness direction of the object 1 upon irradiation with the laser light L is lower in the laser processing method in accordance with the present invention than in the case where the modified region 172 is formed after forming the modified region 171 as shown in FIGS. 20(A) and 20(B). Consequently, the unmodified region 101b shown in FIG. 21 is hard to occur, whereby the object 1 can be cut with a high precision while preventing chipping and skirts from occurring. Therefore, the cleaving quality of the object 1 can be improved. The effect due to the laser processing method in accordance with this embodiment becomes remarkable when the thickness d of the object 1 is 300 μm or greater. This will now be explained in detail with reference to FIG. 18.

Figure 18:
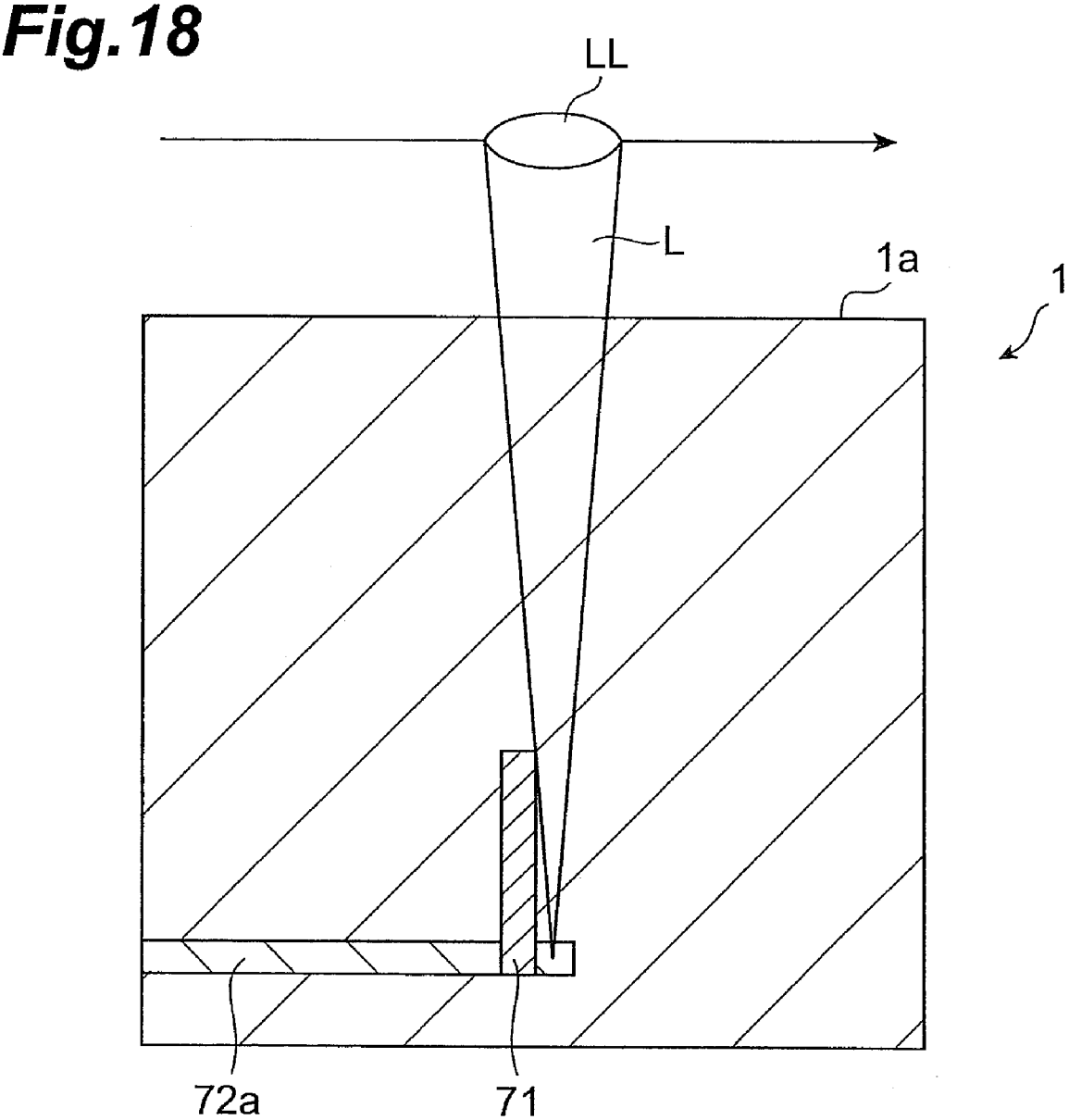
FIG. 18 is a schematic sectional view of the object in a step when forming the modified region by using the laser processing method in accordance with the embodiment.
Figure 24:
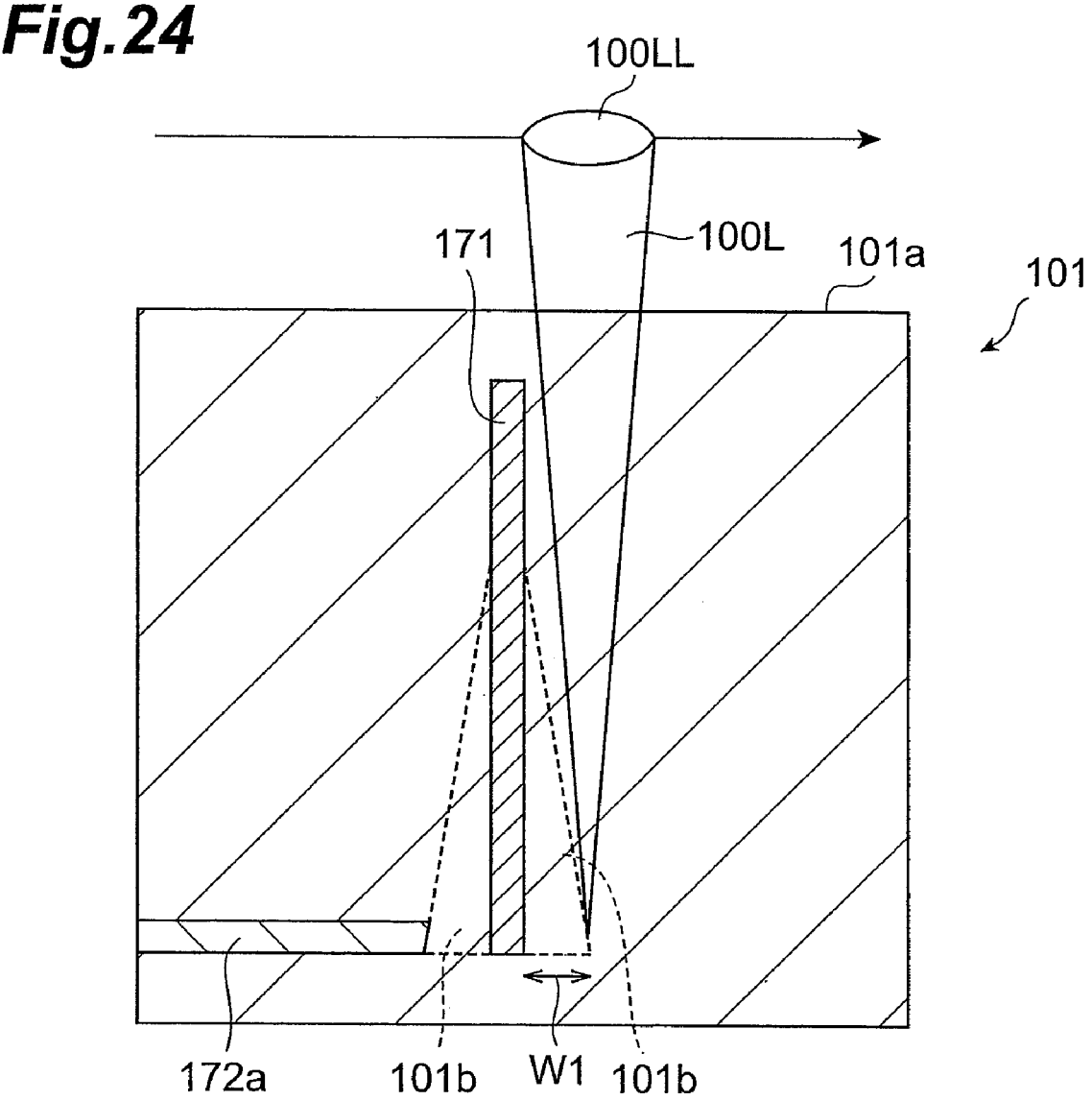
FIG. 24 is a schematic sectional view of the object in a step when the modified regions are formed in the order shown in FIGS. 20(A) and 20(B).

FIG. 18 is a schematic sectional view of the object 1 in a step when the modified regions 71 to 76 are formed by using the laser processing method in accordance with this embodiment. As an example, FIG. 18 shows a step of forming the modified region 72. A modified region 72a constituting a part of the modified region 72 is formed within the object 1 by scanning with the laser light L converged by a lens LL. Here, the height of the modified region 71 in the thickness direction of the object 1 is lower than that of the modified region 171 shown in FIG. 24. Therefore, the unmodified region 101b shown in FIG. 24 hardly remains in FIG. 18.

In this embodiment, the modified region 72 is formed after forming the modified region 71 in the first step, and the modified region 74 is formed after forming the modified region 73 in the second step. In the case where the modified regions 71 to 74 are formed in such an order, the laser light L is moved along the line to cut 5b in any of times when forming the modified regions 72, 73, which makes it unnecessary to change the moving direction of the laser light L between the first and second steps (see FIGS. 14(B) and 14(C)). As a consequence, the modified region 73 can be formed in a short time with a high precision.

Similarly, the modified region 74 is formed after forming the modified region 73 in the second step, and the modified region 76 is formed after forming the modified region 75 in the third step, whereby the modified region 75 can be formed in a short time with a high precision (see FIGS. 15(A) and 15(B)).

Preferably, first entrance face information of the entrance face 1a is recorded when forming the modified region 71, and the modified region 74 is formed while using the first entrance face information. The first entrance face information can be obtained, for example, by successively collecting height information of irregularities existing in the entrance face 1a in the thickness direction of the object 1 along the line to cut 5a. Using the first entrance face information, the modified regions 74, 75 can be formed into substantially the same shape as that of the modified region 71 in conformity to irregularities and undulations of the entrance face 1a along the line to cut 5a.

Similarly, it will be preferred if second entrance face information of the entrance face 1a is recorded when forming the modified region 72, and the modified region 73 is formed while using the second entrance face information. The second entrance face information can be obtained, for example, by successively collecting height information of irregularities existing in the entrance face 1a in the thickness direction of the object 1 along the line to cut 5b. Using the second entrance face information, the modified regions 73, 76 can be formed into substantially the same shape as that of the modified region 71 in conformity to irregularities and undulations of the entrance face 1a along the line to cut 5b.

The above-mentioned height information is measured, for example, as follows. First, measurement laser light is converged by a lens, so as to illuminate the entrance face 1a, and reflected light of the measurement laser light is detected. According to the reflected light detected, the lens is displaced by an actuator using a piezoelectric device such that the light-converging point of measurement laser light is positioned on the entrance face 1a. The amount of displacement is acquired as height information.

Figure 19:
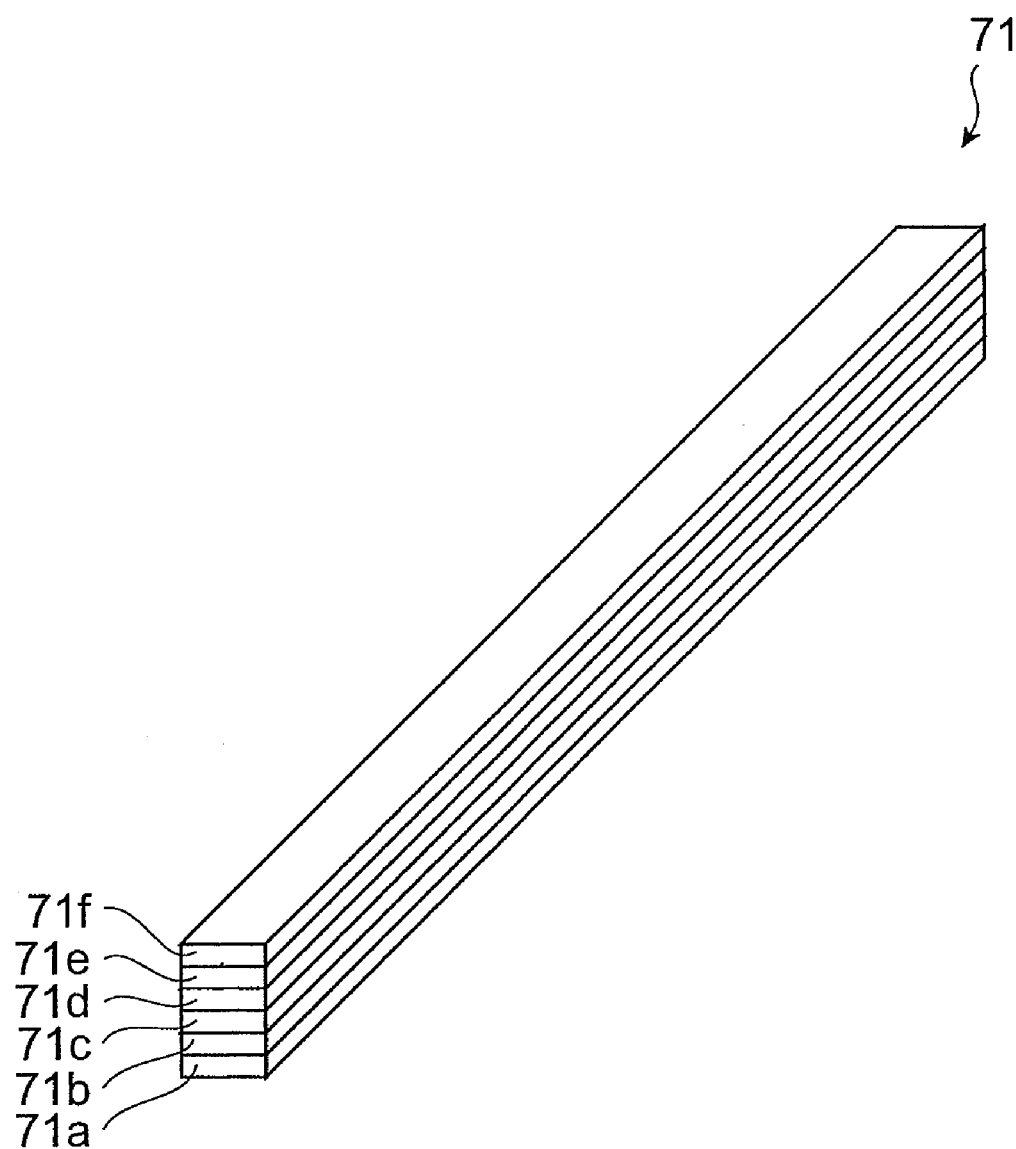
FIG. 19 is a perspective view showing an example of the modified region formed by using the laser processing method in accordance with the embodiment.

As shown in FIG. 19, the modified region 71 may be constituted by a plurality of rows of modified regions 71a to 71f aligned in the thickness direction of the object 1, for example. FIG. 19 is a perspective view showing an example of the modified region 71. Similarly, each of the modified regions 72 to 76 may be constituted by a plurality of rows of modified regions (not depicted) aligned in the thickness direction of the object 1. This can enhance and control the height of each of the modified regions 71 to 76 in the thickness direction of the object 1. For preventing modified regions formed earlier from blocking the laser light L, the modified regions 71a to 71f are successively formed from the side farther from the entrance face 1a. As with the above-mentioned modified region 7, the modified regions 71a to 71f may be constituted by modified regions formed continuously or modified regions formed intermittently at predetermined intervals.

Here, at least one or all of the modified regions 71 to 76 may be constituted by a plurality of rows of modified regions.

The modified regions 71 and 72 may be constituted by the same number of rows of modified regions aligned in the thickness direction of the object 1. This makes it easier for the modified regions 71 and 72 to have the same height in the thickness direction of the object 1. When the modified region 71 is constituted by 6 rows of modified regions 71a to 71f as shown in FIG. 19, for example, it will be preferred if the modified region 72 is also constituted by 6 rows of modified regions (not depicted).

Similarly, the modified regions 73 and 74 may be constituted by the same number of rows of modified regions aligned in the thickness direction of the object 1, or the modified regions 75 and 76 may be constituted by the same number of rows of modified regions aligned in the thickness direction of the object 1. At least one set of (a) modified regions 71, 72; (b) modified regions 73, 74; and (c) modified regions 75, 76 may be constituted by the same number of rows of modified regions. An example is a case where the modified regions 71 and 72 are constituted by the same number of rows of modified regions, the modified regions 73 and 74 are constituted by different numbers of rows of modified regions, and the modified regions 75 and 76 are constituted by different numbers of rows of modified regions.

Another example is a case where the modified regions 71 and 72 are constituted by the same number (a) of rows of modified regions, the modified regions 73 and 74 are constituted by the same number (b) of rows of modified regions, and the modified regions 75 and 76 are constituted by the same number (c) of rows of modified regions. In this case, the numbers a, b, and c may be identical to or different from each other.

Though a preferred embodiment of the present invention is explained in detail in the foregoing, the present invention is not restricted thereto.

For example, the order of forming the modified regions 71, 72 in the first step is not restricted in particular. The order of forming the modified regions 73, 74 in the second step is not restricted in particular. The order of forming the modified regions 75, 76 in the third step is not restricted in particular. Specifically, the modified region 72 may be formed after forming the modified region 71 in the first step. The modified region 73 may be formed after forming the modified region 74 in the second step. The modified region 75 may be formed after forming the modified region 76 in the third step.

The first to third steps may further be repeated so as to form additional modified regions in the thickness direction of the object 1. For example, after the third step, respective modified regions extending along the lines to cut 5a and 5b may be formed so as to alternate in the thickness direction of the object 1. This makes it possible to adjust the height of modified regions in the thickness direction of the object 1 according to the thickness of the object 1.

The modified regions 71 to 76 are not necessarily formed by multiphoton absorption generated within the object 1. The modified regions 71 to 76 may be formed by causing light absorption equivalent to multiphoton absorption within the object 1.

Though a semiconductor wafer made of silicon is used as the object 1 in this embodiment, the semiconductor wafer material is not limited thereto. Examples of the semiconductor wafer material include group IV element semiconductors other than silicon, compound semiconductors including group IV elements such as SiC, compound semiconductors including group III-V elements, compound semiconductors including group II-VI elements, and semiconductors doped with various dopants (impurities).

A procedure of cutting the object 1 in an example shown in FIG. 17 mentioned above will now be explained in detail, though the present invention is not limited to this example. In this example, the object 1 is a silicon wafer having a thickness of 725 μm. For example, the modified region 71 is formed by 6 rows of modified regions 71a to 71f aligned in the thickness direction of the object 1 (see FIG. 19). Namely, a scanning step in which the laser light L is moved along the line to cut 5a (see FIG. 15(A)) is performed 6 times, so as to form the modified region 71. The scanning steps are carried out while incrementally shifting the position of the light-converging point P at 6 stages toward the entrance face 1a, respectively.

Similarly, each of the modified regions 72 to 74 is formed by 6 rows of modified regions aligned in the thickness direction of the object 1, whereas each of the modified regions 75, 76 is formed by 7 rows of modified regions aligned in the thickness direction of the object 1. Therefore, the modified regions 71, 74, 75 are constituted by 19 rows of modified regions in total, whereas the modified regions 72, 73, 76 are also constituted by 19 rows of modified regions in total (see FIG. 16). After the modified regions 71 to 76 are formed, an expandable tape is attached to the object 1, and the object 1 is cut by an expander together with the expandable tape. FIG. 17 is a view showing a photograph taking a cross section of thus cut object 1.

A laser processing condition at the time of forming the modified regions 71 to 76 in the above-mentioned example will now be explained. The pulse width of the laser light L is 180 ns. The irradiation position interval (pulse pitch) of the laser light L is 4 μm. The frequency of the laser light L is 75 kHz. The moving speed of the stage mounting the object 1 is 300 mm/s. The relationship between the distance (light-converging point position) from the entrance face 1a to the light-converging point P and the energy of laser light L is as shown in Table 1.

TABLE 1

|  | Light-converging point position (μm) | Energy (μJ) |
| --- | --- | --- |
| Modified region 76 | 50 | 9 |
|  | 86 | 9 |
|  | 142 | 15 |
|  | 182 | 15 |
|  | 214 | 15 |
|  | 250 | 15 |
|  | 286 | 15 |

TABLE 1-continued

| | Light-converging point position (μm) | Energy (μJ) |
|---|---|---|
| Modified region 73 | 322 | 15 |
| | 358 | 15 |
| | 394 | 15 |
| | 426 | 15 |
| | 458 | 15 |
| | 490 | 15 |
| Modified region 72 | 522 | 15 |
| | 570 | 15 |
| | 618 | 15 |
| | 666 | 15 |
| | 694 | 15 |
| | 722 | 15 |

INDUSTRIAL APPLICABILITY

The present invention can provide a laser processing method by which an object to be processed can be cut with a high precision.

The invention claimed is:

1. A laser processing method including:
a first step of irradiating a planar object to be processed with laser light while locating a light-converging point within the object, so as to form a first modified region to become a starting point region for cutting within the object along a first line to cut in the object, and form a second modified region to become a starting point region for cutting within the object along a second line to cut intersecting the first line to cut such that the second modified region intersects at least a part of the first modified region; and
a second step of irradiating the object with the laser light while locating the light-converging point within the object after the first step, so as to form a third modified region to become a starting point region for cutting along the first line to cut within the object between the first modified region and an entrance face of the object where the laser light is incident, and form a fourth modified region to become a starting point region for cutting along the second line to cut within the object between the second modified region and the entrance face such that the fourth modified region intersects at least a part of the third modified region.

2. A laser processing method according to claim 1, wherein the second modified region is formed after forming the first modified region in the first step; and
wherein the fourth modified region is formed after forming the third modified region in the second step.

3. A laser processing method according to claim 1, wherein the second modified region is formed after forming the first modified region in the first step; and
wherein the third modified region is formed after forming the fourth modified region in the second step.

4. A laser processing method according to claim 1, wherein first entrance face information of the entrance face is recorded when forming the first modified region, and the third modified region is formed while using the first entrance face information; and
wherein second entrance face information of the entrance face is recorded when forming the second modified region, and the fourth modified region is formed while using the second entrance face information.

5. A laser processing method according to claim 1, wherein at least one of the first to fourth modified regions is constituted by a plurality of rows of modified regions aligned in a thickness direction of the object.

6. A laser processing method according to claim 1, wherein at least one set of the first and second modified regions and the third and fourth modified regions are constituted by the same number of rows of modified regions aligned in the thickness direction of the object.

* * * * *